United States Patent [19]
Pizano et al.

[11] Patent Number: 5,293,429
[45] Date of Patent: Mar. 8, 1994

[54] SYSTEM AND METHOD FOR AUTOMATICALLY CLASSIFYING HETEROGENEOUS BUSINESS FORMS

[75] Inventors: Arturo Pizano, Milpitas; May-Inn Tan, Saratoga, both of Calif.; Naoto Gambo, Tanashi, Japan

[73] Assignees: Ricoh Company, Ltd., Japan; Ricoh Corporation, San Clara, Calif.

[21] Appl. No.: 741,878

[22] Filed: Aug. 6, 1991

[51] Int. Cl.$^5$ .............................................. G06K 9/46
[52] U.S. Cl. ...................................... 382/24; 382/30; 382/61
[58] Field of Search ...................... 382/61, 30, 24, 26; 358/467; 356/71

[56] References Cited

U.S. PATENT DOCUMENTS

| | | | |
|---|---|---|---|
| 4,300,123 | 11/1981 | McMillin et al. | 340/146.3 Z |
| 4,949,392 | 8/1990 | Barski et al. | 382/61 |
| 5,038,392 | 8/1991 | Morris et al. | 382/61 |
| 5,140,650 | 8/1992 | Casey et al. | 382/61 |

OTHER PUBLICATIONS

S. Mori and T. Sakura, *Line Filtering and its Application to Stroke Segmentation of Handprinted Chinese Characters*, Proceedings of the Seventh International Conferernce on Pattern Recognition, pp. 366-369, 1984.

Pavlidis, T., *A Vectorizer and Feature Extractor for Document Recognition*, Computer Vision, Graphics, and Image Processing, No. 35, pp. 111-127, 1986.

H. Bunke, *Automatic Interpretation of Text and Graphics in Circuit Diagrams*, Pattern Recognition Theory Applications, J. Kittler, K. S. Fu and L. F. Pau Editors, D. Reidel, Boston, pp. 297-310, 1982.

M. Karima, K. S. Sadah, and T. O. McNeil, *From Paper Drawings to Computer Aided Design*, IEEE Computer Graphics and Applications, pp. 22-39, Feb. 1985.

L. A. Fletcher and R. Katsuri, *Segmentation of Binary Image into Text Strings and Graphics*, SPIE vol. 768 Applications of Artificial Intelligence, pp. 533-540, 1987.

C. C. Shih, R. Katsuri, *Generation of a Line Description File for Graphics Recognition*, SPIE vol. 937, Applications of Artificial Intelligence, pp. 568-575, 1988.

W. K. Pratt, *Digital Image Processing*, Wiley, New York, pp. 523-525, 1978.

R. G. Casey, D. R. Ferguson, *Intelligent Forms Processing*, IBM Systems Journal, vol. 29, No. 3, 1990, pp. 435-450.

Autoclass Brochure, Visionshape, publicly avaliable Apr. 30, 1991.

IntelliForm Brochure, Executive Technologies, Inc., publicly available Apr. 30, 1991.

*Primary Examiner*—David K. Moore
*Assistant Examiner*—Andrew W. Johns
*Attorney, Agent, or Firm*—Heller, Ehrman, White & McAuliffe

[57] ABSTRACT

Business forms are a special class of documents typically used to collect or distribute data; they represent a vast majority of the paperwork need to conduct business. The present invention provides a pattern recognition system that classifies digitized images of business forms according to a predefined set of templates. The process involves a training phase, during which images of the template forms are scanned, analyzed and stored in a data dictionary, and a recognition phase, during which images of actual forms are compared to the templates in the dictionary to determine their class membership. The invention provides the feature extraction and matching methods, as well as the organization of the form dictionary. The performance of the system was evaluated using a collection of computer generated test forms. The methodology for creating these forms, and the results of the evaluation are also described. Business forms are characterized by the presence of horizontal and vertical lines that delimit the useable space. The present invention identifies these so called regular lines in bi-level digital images to separate text from graphics before applying an optical character recognizer; or as a feature extractor in a form recognition system. The approach differs from existing vectorization, line extraction, and text-graphics separation methods, in that it focuses exclusively on the recognition of horizontal and vertical lines.

11 Claims, 13 Drawing Sheets

PHONE ORDER

NUMBER _____
ACCOUNT NUMBER _____
SHIPPING INSTRUCTIONS _____
SOLD TO:          SHIPPED TO:

| QTY | DESCRIPTION | UNIT PRICE | TOTAL |
|-----|-------------|------------|-------|
|     |             |            |       |
|     |             |            |       |
|     |             |            |       |
|     |             |            |       |
|     |             |            |       |
|     |             |            |       |
|     |             |            |       |
|     |             |            |       |
|     |             |            |       |

TERMS: _____
SALESPERSON: _____
DATE: _____

SUBTOTAL _____
SHIPPING _____
TOTAL ☐

*FIG. 2*

(A) LINE PATTERN  (B) BEFORE MERGING  (C) AFTER MERGING

ORIGINAL IMAGE

```
..1.....2.....3
```

AFTER 1 LINE

```
...1......2.....3
..11.....22....3
..11.....22....3
..11.....22....3
..11.....22....3
..11.....22...33
..11.....22...33
..11.....22...33
...11....2....33
....1..22.....33
```

AFTER 10 LINES

```
..1......1.....3
..11....11.....3
..11....11.....3
..11....11.....3
..11....11.....3
..11....11....33
..11....11....33
..11....11....33
...11....1....33
....1..11.....33
....1111......33
```

AFTER 11 LINES

```
..1......1.....3
..11....11.....3
..11....11.....3
..11....11.....3
..11....11.....3
..11....11....33
..11....11....33
..11....11....33
...11....1....33
....1..11.....33
....1111......33
.....11.......33
.....11.......33
.....11.......33
.....11.......33
.....11.......33
```

FINAL MARKER VALUES

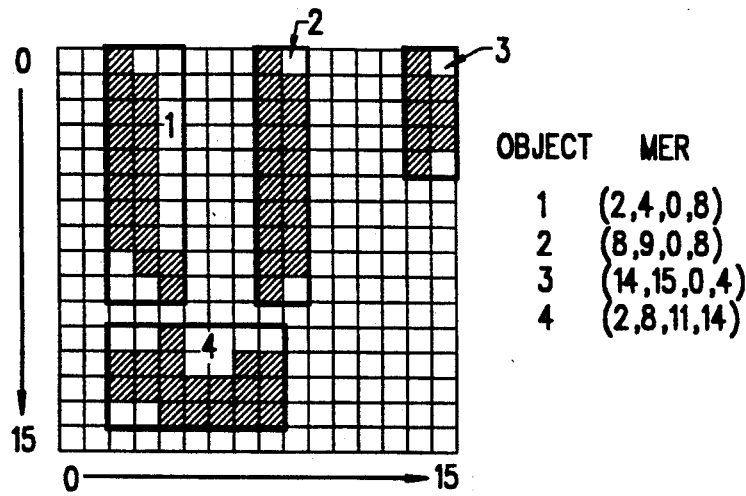
| OBJECT | MER |
|--------|-----|
| 1 | (2,4,0,8) |
| 2 | (8,9,0,8) |
| 3 | (14,15,0,4) |
| 4 | (2,8,11,14) |
FIG. 14
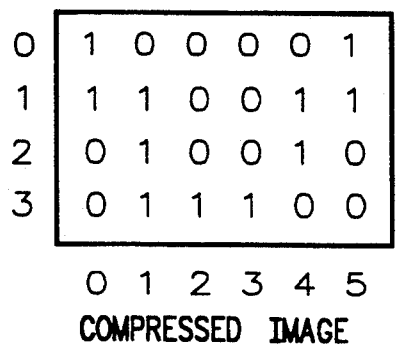
COMPRESSED IMAGE
FIG. 15A
| NO. | id | minX | maxX | minY | maxY |
|-----|----|------|------|------|------|
| 1 | 1 | 0 | 1 | 0 | 2 |
| 2 | 2 | 4 | 5 | 0 | 2 |
AFTER ROW 2
FIG. 15B
| NO. | id | minX | maxX | minY | maxY |
|-----|----|------|------|------|------|
| 1 | 1 | 0 | 1 | 0 | 3 |
| 2 | 2 | 4 | 5 | 0 | 2 |
AFTER (3,1)
FIG. 15C
| NO. | id | minX | maxX | minY | maxY |
|-----|----|------|------|------|------|
| 1 | 1 | 0 | 2 | 0 | 3 |
| 2 | 2 | 4 | 5 | 0 | 2 |
AFTER (3,2)
FIG. 15D
| NO. | id | minX | maxX | minY | maxY |
|-----|----|------|------|------|------|
| 1 | 1 | 0 | 5 | 0 | 3 |
| 2 | 1 | 4 | 5 | 0 | 2 |
AFTER (3,3)
FIG. 15E

ORIGINAL IMAGE

AFTER COMPRESSION

ORIGINAL IMAGE

CONNECTED COMPONENT IDENTIFIED WITH THE
ORIGINAL COMPRESSION ALGORITHM

CONNECTED COMPONENTS IDENTIFIED WHEN
RULE 1 IS APPLIED

SYSTEM AND METHOD FOR AUTOMATICALLY CLASSIFYING HETEROGENEOUS BUSINESS FORMS

BACKGROUND OF THE INVENTION

The present invention relates to a business form recognition system and method.

Business forms are a special class of documents typically used to collect or distribute data. Their use is widespread across industry and government, and their volume accounts for a very large portion of the paperwork needed to conduct business. The present invention is a form recognition mechanism that provides the basis for developing image processing systems capable of dealing with multiple form formats simultaneously.

The use of digital instruments to capture and manage document images has gained considerable acceptance during the last few years. A wide variety of systems capable of scanning, processing, displaying and storing these images are now commercially available. They range from stand-alone personal computers, with a simple scanner and few megabytes of secondary memory, to large networks of workstations and mainframes, with high-speed scanners and gigabytes of optical storage.

The majority of these so-called Document Image Management Systems (DIMS) are designed to process batches of homogeneous documents, e.g., canceled checks, insurance claims, or credit card vouchers. While this approach is satisfactory in today's very-large volume operations, it is likely that new applications will have to process groups of heterogeneous documents. This is believed to be particularly so if the use of DIMS reaches all areas of an organization including units such as the mail room, the production floor, or the personnel department, where there is not a predominant type of document, but rather an assortment of formats.

SUMMARY OF THE INVENTION

It is an object of the present invention to provide an improved business form recognition system and method.

The recognition system according to the present invention provides means and a corresponding method for automatically classifying streams of heterogeneous business forms. This capability is essential in the development of multi-format document processing applications.

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 2 depicts a diagram of sample business form.

FIG. 14 depicts minimum enclosing rectangles.

FIGS. 15(a)–(e) depict component table changes during merging.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

1. Methodology

This section describes the methodology chosen for the development of the form recognition system. This methodology follows the classical pattern recognition approach in which features are extracted from the objects of interest, then matched against those of a group of templates that characterize the pattern classes.

More specifically, business form recognition involves two steps:

1. Training—during which templates representing the form classes in the application domain are scanned, their features extracted, and the results organized in a form dictionary; and
2. Classification—during which the features of actual production forms are systematically compared to those of the dictionary templates, until a match is found, or an 'unrecognized-form' decision is reached.

Figure 1:
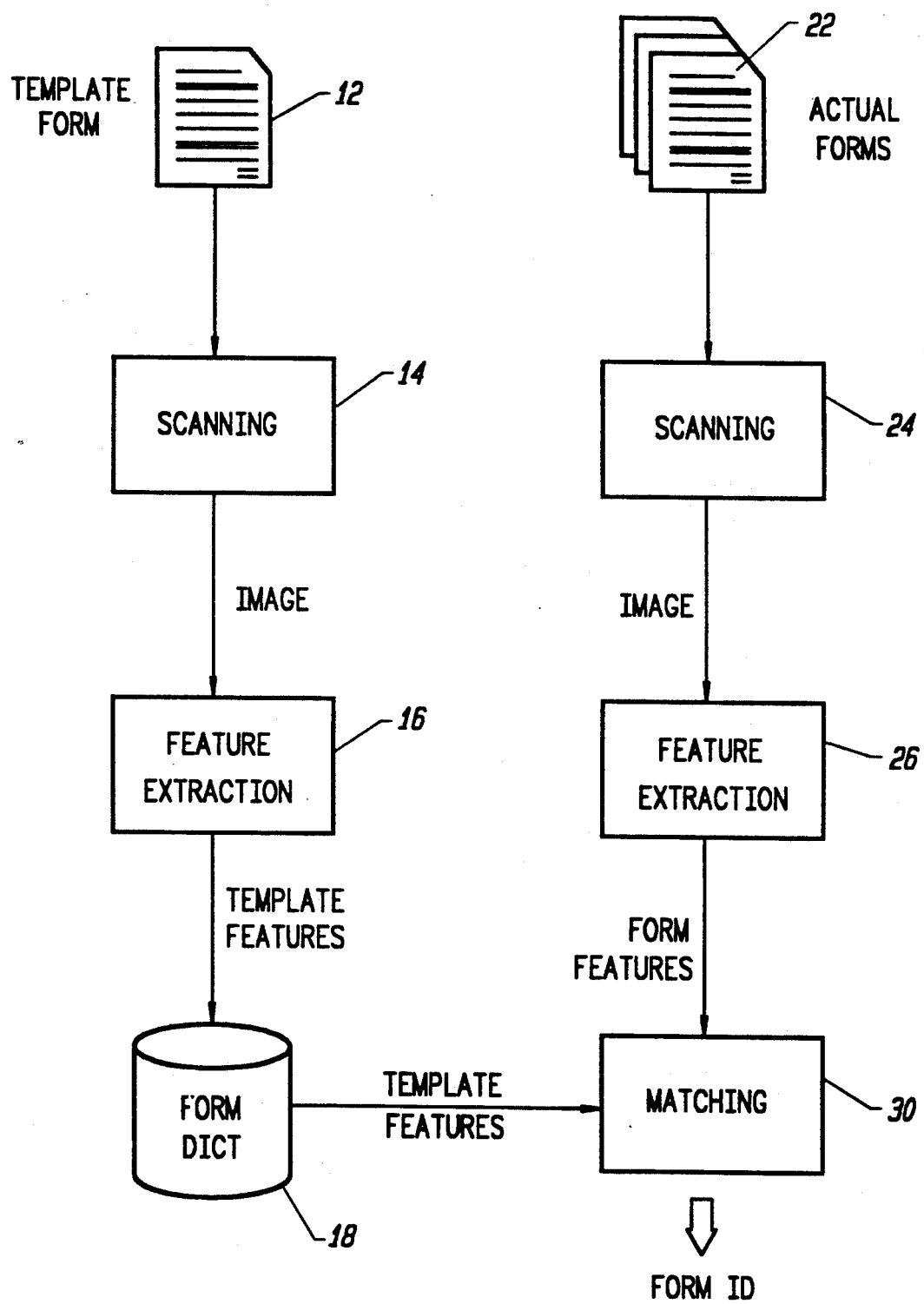
FIG. 1 depicts a block diagram of system components for a business form recognition system.

The process is illustrated in FIG. 1. The components of this diagram, with the exception of the scanning module, are discussed in the following sections.

The system components of FIG. 1 include a template form 12 which is input to feature extraction 16 with suitable scanning 14.

The feature extraction 16 provides template features which are stored in a form dictionary 18.

The actual business forms 22 are scanned through suitable scanning 24 to provide an image to feature extraction 26.

The features of the form are extracted as will be described below, and with proper matching 30 with the template features and the form features a form identification is provided as an output.

2. Feature Extraction

This section describes the use of horizontal and vertical lines as features for identifying a form. It briefly details the limitations of existing line extraction techniques, and sketches an improved approach that uses specific properties of business forms to enable faster recognition.

Business forms are characterized by the presence of predefined fields where data is to be entered. These fields are usually identified by a combination of horizontal and vertical lines that delimit the usable space; see FIG. 2. In most cases, these lines provide a pattern that uniquely identifies a form, and therefore can be used to distinguish them. The remainder of the section sketches an algorithm that identifies these so called regular lines. In situations where two forms share identical line organizations, there are normally form ids or logos that differentiate them. While these objects can be used to resolve ambiguities, the current implementation of the system uses lines exclusively.

There are numerous papers describing algorithms that transform raster images into vectors. These methods convert raw image data into high-level picture descriptors more suitable for manipulation at the application level. They are used to identify strokes in optical character recognition systems [1,2], or to vectorize scanned images of line drawings, originally produced in paper, so that they can be used in graphics programs [3,4,5,6].

In principle, several of the algorithms listed above can be adapted to recognize regular lines in form images. However, since they were designed to identify every line and curve, regardless of its orientation or size, they cannot accomplish the task in the most efficient manner. For example, the picture decomposition algorithm described in [5] uses the Hough transform [7] to group collinear components. This operation is necessary because their orientation is arbitrary. By contrast, the component identification technique used in this work distinguishes only segments that are parallel the image axis, thus enabling the grouping of two objects to be performed using a simple test on the distance between their closest end-points. The previous example suggests that it should be possible to design a more efficient regular line recognition algorithm using specific knowledge about the properties of these lines. This knowledge can be summarized as follows:

1. Regular lines are parallel to the image axis. This allows the algorithm to focus on sequences of connected black-pixels located within the same row or column.
2. They intersect at 90 degree angles. Thus searching for horizontal lines while the image is scanned line-by-line, is equivalent to searching for vertical lines while the image is scanned column-by-column. This enables the design of a simpler algorithm that: (1) focuses exclusively on finding lines parallel to the scan line; and (2) can be run in either direction independently.

These observations were taken into account in the design of a new line extraction algorithm. This algorithm performs the recognition task in four steps as follows:

Step 1: Connected Component Identification

During these phase the form image is scanned line-by-line (column-by-column) while sets of neighboring black pixels are identified. These sets, termed connected components, provide the basic building blocks for the line identification.

Step 2: Thin Object Selection

After the connected components have been identified, their height and width is tested to determine if they are likely to be line segments. Only those components that exhibit an elongated geometry, i.e. its width is much larger than its height (horizontal lines), or vice-versa (vertical lines), are accepted.

Step 3: Merging

Once the set of thin connected components has been identified, the next step is to determine whether two contiguous segments are likely to be part of the same line. If the test is passed, the segments are merged, otherwise they are considered separate objects. The thin components that remain after the merging process are considered lines.

Step 4: Post-Recognition Processing

During the final phase, the algorithm eliminates patterns erroneously recognized as lines because of noise or skewing in the picture. A series of rules describing the types of line patterns found in typical business forms are used for this purpose.

Experiments performed with this algorithm show that it is considerably faster than the more detailed approaches. For example, results in [2] show that it takes approximately three minutes to process a 2048 by 2048 pixels image. By contrast, the new recognition algorithm can process a typical form (1672 by 2176 pixels) in less than three seconds. While these measurements should not be compared directly, given the differences in the work performed in each case, they are still indicative of the advantage gained by specializing the approach. The algorithm is described in more detail below.

3. Matching

The type of form recognition proposed in the present invention presumes the existence of a dictionary containing templates representing the classes of documents to be found in the application domain. This section sketches a matching algorithm that systematically traverses this form dictionary to determine the class to which an actual production form, or simply actual form, belongs.

Regular lines were identified in section two as the primary means of form identification. The level of information they provide, however, is very detailed, and not always needed to decide that a form does not belong to a class. For example, if the number of lines detected in an actual form is 35, and a template has 150 lines, the likelihood of the form belonging to this class is very low. Hence, the comparison of the actual line positions, or their lengths, is unnecessary.

Figure 3:
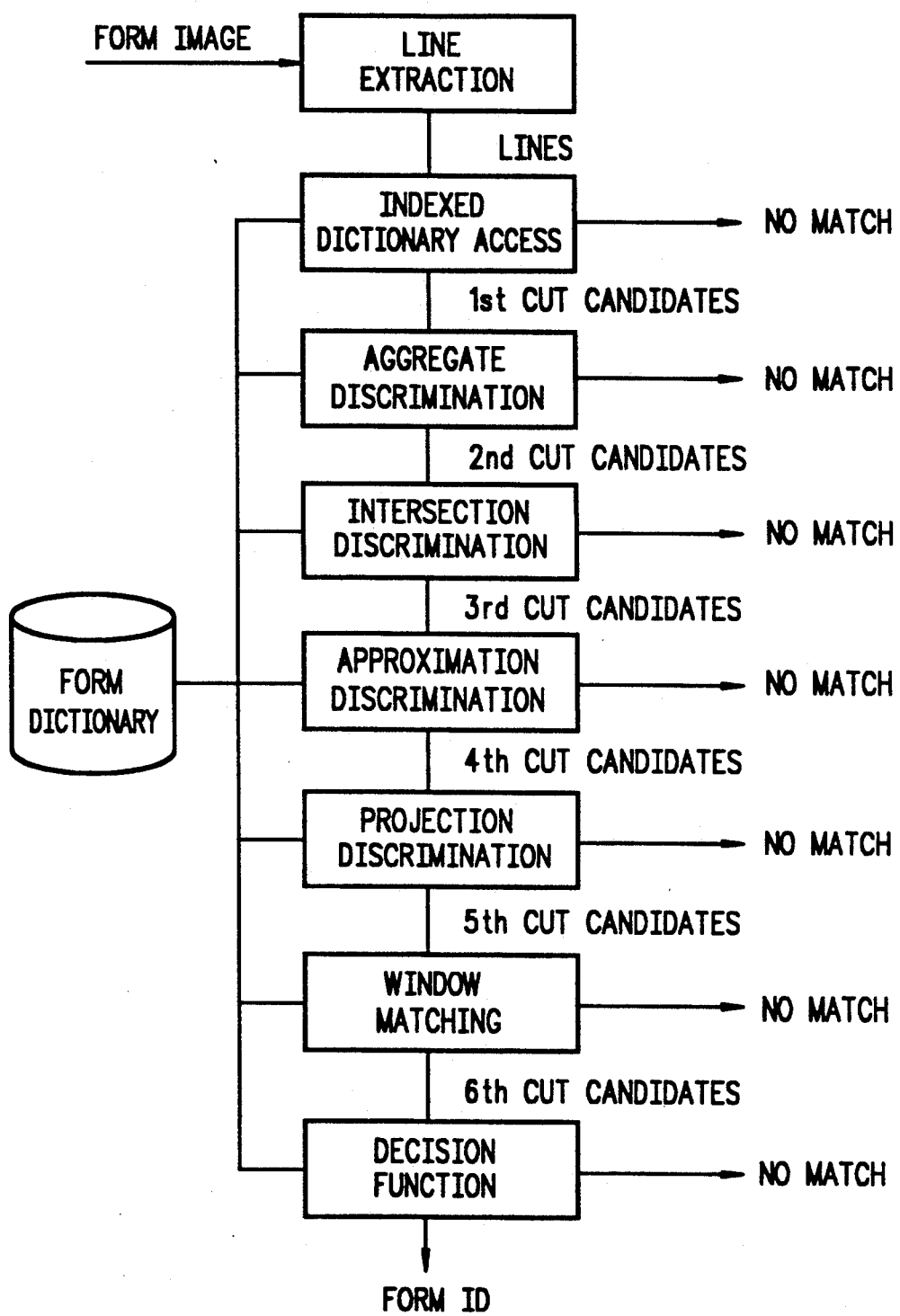
FIG. 3 depicts a matching process.

In general, the form matching process may be carried out in a stepwise fashion where the system first constructs a collection of initial candidates, then applies a series of discriminant functions to eliminate templates unlikely to be matches for the actual form; see FIG. 3. The process continues until only a few candidates remain, at which point a decision function is applied, or the candidate list is empty, in which case a "not-recognized" decision is reached. Each step is described next.

3.1 Indexed Dictionary Access

Referring to FIG. 3, templates in the form dictionary are ordered according to a numeric key derived from the line information obtained in the feature extraction process. During the indexed dictionary access step, the system derives the same value from the actual form, then uses it to query the form dictionary as follows:

| | |
|---|---|
| retrieve | templates |
| from | dictionary |
| where | template-key > actual-key*MIN_KEY_DISC_RATIO |
| and | template-key < actual-key*MAX_KEY_DISC_RATIO | where MIN_KEY_DISC_RATIO and MAX_KEY_DISC_RATIO are adjustable threshold values.

The current implementation of the algorithm adds the length of all the lines found in the image and uses it as key value. The criteria used in selecting this formula were the simplicity of its computation, and its ability to separate forms with considerably different line patterns.

3.2 Aggregate Discrimination

Aggregate-based discriminants condense line information from templates and actual forms into single scalar values, e.g. line and intersection counts, or line length sums. They use the ratio of these values, or their absolute difference, to discard templates from the candidate list. Aggregate discriminants involve simple arithmetic and geometric computations, thus providing an inexpensive way of eliminating those templates that differ the most from the actual form.

Aggregate values currently used as discriminants include: (1) the number of lines, (2) the number of "long" lines, and (3) the number of lines that cross the form center. These functions were selected because they measure different properties of the line pattern, and their computation is inexpensive. Thus, for example, while the number of lines in two forms could be very close, any differences in their actual length would be reflected in the total line weight. Similarly, two forms could have the same line weight, but differences in the line locations would be reflected in the number of lines that cross the form center. The computation of the first two aggregates requires trivial arithmetic operations. The third case requires testing whether a line intersects the center of the form. Since all the lines are regular, this test is reduced to evaluating the following predicates:

line.Xmin < ROW_LENGTH/2 < line.Xmax
(horizontal lines)

line.Ymin < LINES/2 < line.Ymax (vertical lines)

where $\{(Xmin, Ymin), (Xmax, Ymax)\}$ are the line's end-point coordinates.

3.3 Intersection Discrimination

Aggregate discriminators measure global properties of the line pattern, but do not take into account the location of the lines in the form. The intersection discriminator uses the spatial relationship indicated in its name to determine the similarity between two line patterns. It involves finding the points where horizontal and vertical lines meet.

The test is in fact a new form of aggregate discrimination, since it only uses the count of intersection points and not their location. However, it is considered separately because its computation is more expensive ($O(N^2)$ versus $O(N)$), and thus it should be performed only in those forms that passed the aggregate discriminators.

In order to compute the intersections in the line pattern it is necessary to consider that, in some cases, the line recognition mechanism approximates the position of a line. Therefore, lines that would actually touch in the real form may be separate after recognition. The following test takes into account these situations:

Intersection test: Let HL be a horizontal line, and let $\{(CL.x_1, HL.y_1), (HL.x_2, HL.y_2)\}$ be the coordinates of its end points. Similarly, let HV and $\{(HV.x_1,HV.y_1), (HV.x_2,HV.y_2)\}$ be a vertical line and its coordinates.

Let W be a rectangle built around HL as follows:

$W.x_1 = HL.x_1 - INTER\_HOR\_WIN\_SIZE$ $W.x_2 = HL.x_2 - INTER\_HOR\_WIN\_SIZE$ $W.y_1 = HL.y_1 - INTER\_VER\_WIN\_SIZE$ $W.y_2 = HL.y_2 - INTER\_VER\_WIN\_SIZE$

HL and HV intersect if and only if W and HV intersect.

Figure 4:
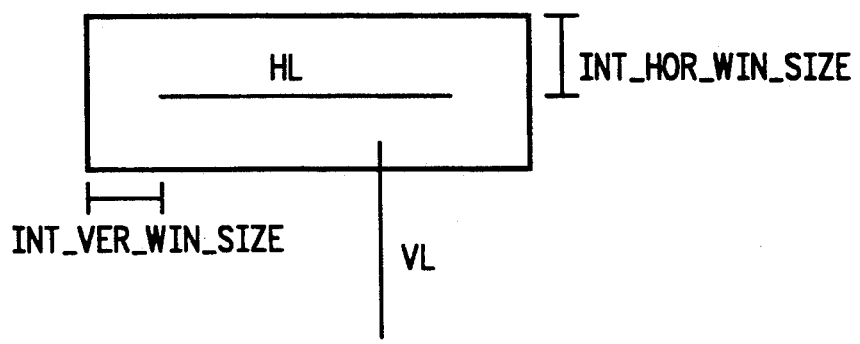
FIG. 4 depicts a scheme used with computing line intersections.

The test, illustrated in FIG. 4, allows for lines that do not intersect but touch, to be counted as intersection. INTER_HOR_WIN_SIZE and INTER_VER_WIN_SIZE are adjustable parameter values. The current implementation of the algorithm records the position of each intersection. These values may be used in the future in a more detailed intersection based discriminant.

3.4 Approximation Discrimination

Figure 5:
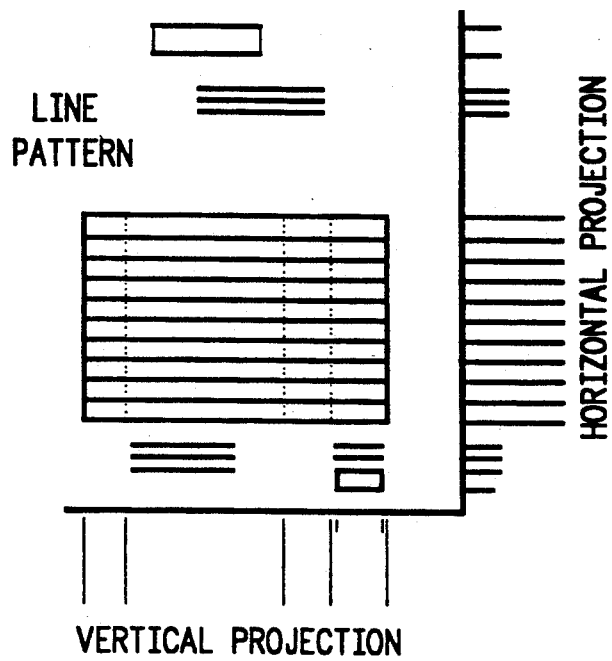
FIG. 5 depicts an illustration of line projections.

The method discussed in this section is one of two projection-based approaches used in the system. These methods map recognized lines into the Cartesian axis of the form (horizontal lines on the Y-axis, and vertical on the X-axis), then compare the patterns created this way to determine their similarity; see FIG. 5. Unlike aggregate discriminants, which do not take into account line locations, the results of the projection methods are affected by them. While more expensive to compute, they are more accurate and still avoid a detailed comparison of the recognized lines.

Figure 6:
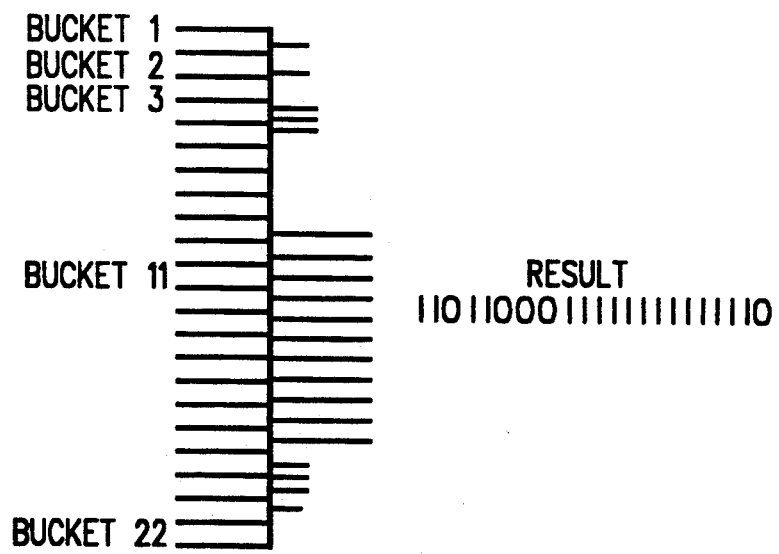
FIG. 6 depicts an approximation method.

The approximation method measures the distribution of lines in the image. It condenses the projection information into a series of binary values that reflect the presence of lines in predefined regions of the image. These regions are obtained by dividing the projection axis into N buckets; see FIG. 6.

The value associated with a bucket is computed with the following formula:

$$b_i = \begin{cases} 1 & \text{if region } N_i \text{ contains at least one line} \\ 0 & \text{otherwise} \end{cases}$$

The set of values $\{b\}$, organized as a string, provide a new feature to be used in differentiating line patterns.

Ideally, the similarity between two forms could be established by a direct comparison of the corresponding strings. In practice, however, this cannot be done because even a slight variation in the position of the form within the image could cause lines to be mapped into different buckets. Instead, the following test determines if a template remains in the candidate list or is rejected.

Step 1

Let T and A be a template and an actual form, and $B(T)=\{b_i(T)\}$ and $B(A)=\{b_i(A)\}$ their horizontal binary strings (the same procedure to vertical lines). Let $$S(B(T))=\Sigma b_i(T)$$

$$S(B(A))=\Sigma b_i(T)$$

be the sum of 1's in B(T) and B(A). If $$|S(B(T))-S(B(A))|>T_1$$

reject T, otherwise proceed with step 2.

Step 2

Let M(B(T)) and M(B(A)) be the median points in the distribution of 1's in B(T) and B(A). If $$|M(B(T))-M(B(A))|>T_2$$

reject T, otherwise proceed with step 3.

Step 3

Let $B_1(T)$ and $B_2(T)$ be the left and right N/2 values of B(T). Define $A_1(T)$ and $A_2(T)$ Similarly. If $$|S(B_1(T))-S(B_1(A))|>T_3 \text{ OR}$$

$$|S(B_2(T))-S(B_2(A))|>T_3 \text{ OR}$$

$$|M(B_1(T))-M(B_1(A))|>T_4 \text{ OR}$$

$$|M(B_2(T))-M(B_2(A))|>T_4$$

reject T, otherwise accept it.

These tests were designed to measure different properties of the line patterns and to be tolerant of small differences in the binary strings.

3.5 Projection Discrimination

The projection discriminant also uses the histogram-like structures that result from mapping the form lines into the image axis. However, unlike the approximation method, which depends only on whether a line falls within the boundaries of a bucket, the projection method performs a one to one comparison of the lines that appear in the projected image. This comparison involves both the line length, as well as the distance between lines. The only knowledge that is not taken into account is the position of lines with respect to their parallel axis. For example, a 110 pixel line located on the left hand side of a row, is mapped exactly the same way as a line with the same length, but located on the right portion of the row.

Figure 7:
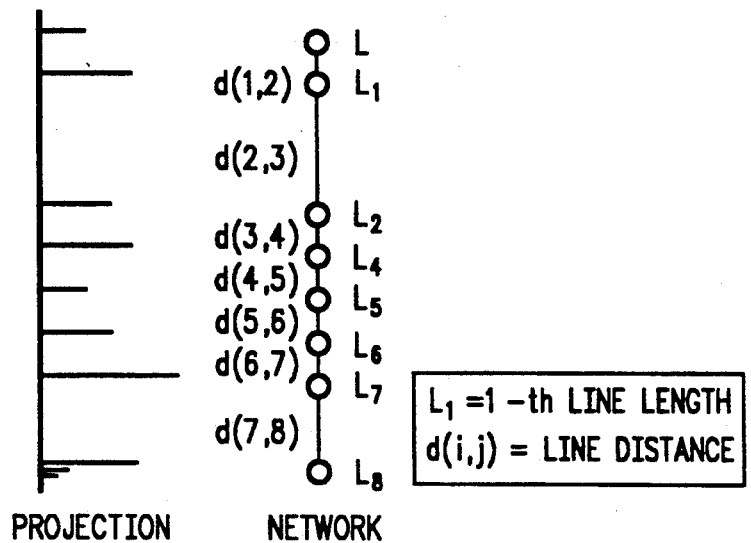
FIG. 7 depicts a network representation of line projections.
Figure 8:
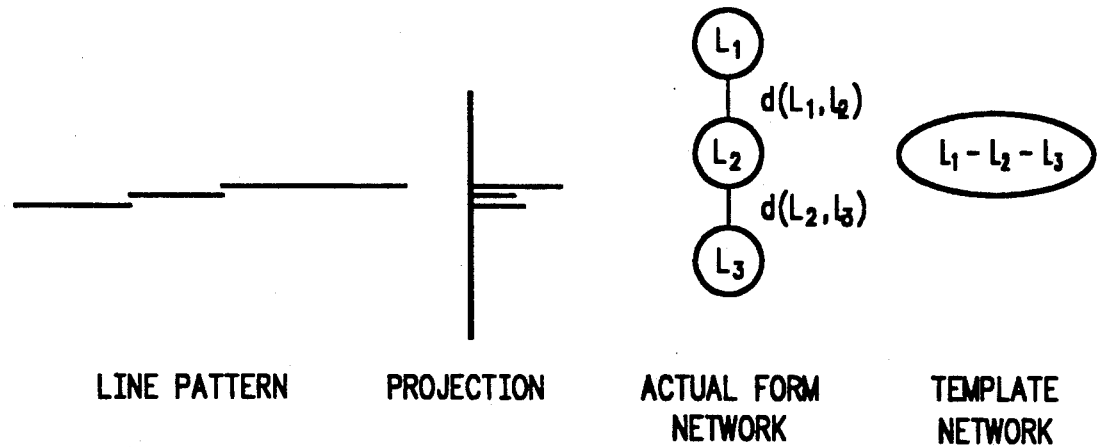
FIG. 8 depicts relationships between actual form and template nodes.

A network representation of the line projections, in which nodes represent lines and their lengths, and arcs the distance that separates them, is used in the method; see FIG. 7. The algorithm traverses the actual form and template networks simultaneously trying to match as many nodes and arcs as possible. Since there may be small variations in the line lengths and distances observed in the forms, the match is done by comparing the difference to a threshold. Furthermore, the algorithm uses a series of rules to identify cases in which the relation between nodes in the actual and template networks is many-to-one. These cases occur if the pattern of the actual form contains broken lines, created by noise or skewing in the image, or extra lines derived from signatures, stamps or text that was not present in the template; see FIG. 8.

3.6 Window Matching

The window matching test performs a detailed analysis of the line patterns in the actual and template forms. It takes into account all the information available form the recognized lines. Thus, it provides the most accurate way to compare the forms, but also the most expensive. Candidates that reach this level in the matching process are expected to have very similar line patterns.

The method described in this section is based on the concept of "matching windows." These windows, defined as rectangles enclosing the lines of template forms, are used to determine the degree of similarity between two line patterns. They are built during the training phase of the form recognition, and stored in the data dictionary for use during the recognition phase. The process is described next. The discussion is given in terms of the horizontal lines. However, it is equally applicable to vertical lines. The following definitions are used throughout the text:

| | |
|---|---|
| T: | template form |
| A: | actual form |
| HLines(T): | T's horizontal line pattern |
| HLines(A): | A's horizontal line pattern |
| hli(T)=(x1,x2,y) | i-th member of HLines(T) |
| HWS | horizontal window size |
| VWS | vertical window size |

Figure 9:
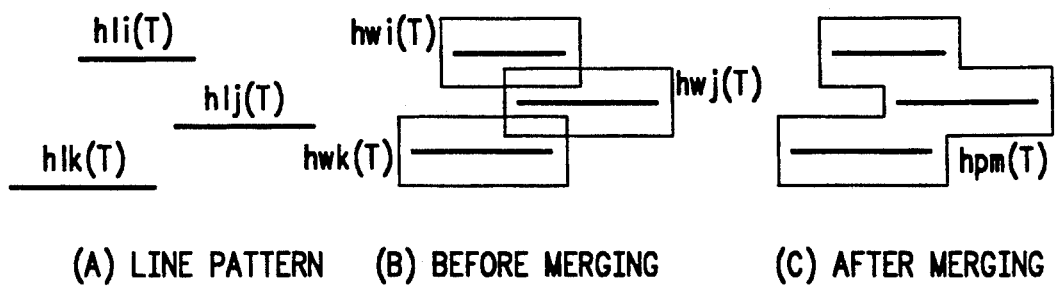
FIG. 9 depicts window generation process.

Windows are defined when the system is being trained. During this process the set of lines HLines(T) is passed to an algorithm that generates a collection of polygons HPolygons(T), and set of scalar values HScore(T), as follows; see FIG. 9.

Step 1: Window Creation

For each line $hl_i(T)$ create a rectangular window $$hw_i(T)=x_1-HWS, x_2+HWS, y-VWS, y+VWS,)$$

see FIG. 9b.

Step 2: Window Merging

For every pair of windows $hw_i(T)$ and $hw_j(T)$, s.t.

$$hw_i(T) \cap hw_j(T) \neq 0$$

create a polygon $$hp_m(T)=hw_i(T) \cup hw_j(T).$$

Repeat this step until all the rectangular windows that intersect are fused into a polygon; see FIG. 9c. Let $HPolygons(T)=\{hp_m(T)\}$ be the resulting set.

Step 3: Template Scoring

Figure 10:
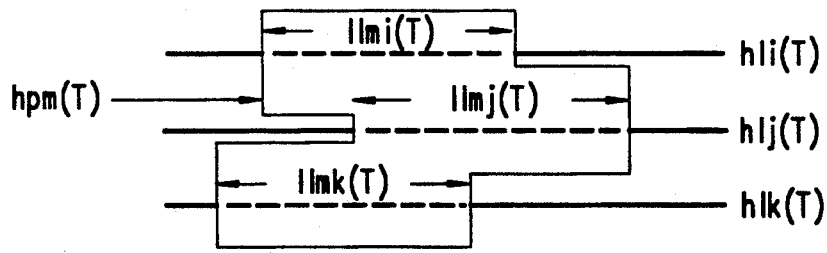
FIG. 10 depicts window scoring.

Let $hls_{mk}(T)$ be the segment of $hl_k(T)$ visible within $hp_m(T)$, and let $ll_{mk}(T)$ be its length; see FIG. 10. The score of each window is defined as $$hs_m(T) = \sum_k ll_{mk}(T)$$

The scoring phase of the dictionary training process involves computing the set $HScore(T)=\{hs_m(T)\}$, and storing it in the data dictionary.

The evaluation of $ll_{mk}(T)$ requires computing the intersection of a line and a polygon. While this can be done through conventional formulas, the computation is made easier by the fact that every polygonal window can be described in terms of the rectangles that generated it. For example, if $hp_m(T)$ is the intersection of $hw_i(T)$ and $hw_j(T)$, the resulting polygon may be described as $$\{hw_i(T) \cup hw_j(T))\} - \{hw_i(T) \cap hw_j(T)\}$$

This equivalence can be used to compute the total line length as follows:

$$ll_{mk}(T) = LRIntersect(hl_k(T), hw_i(T)) + LRIntersect(hl_k(T), hw_j(T)) + LRIntersect(hl_k(T), hw_i(T))$$

where LRintersect is a function that: (1) determines the segments of a line that intersects a rectangle, and (2) evaluates their length. Notice that this is a simple function since both the line and the rectangle are always regular.

The extension of this formula to cases where three or more rectangles intersect is possible through the following equivalence:

$$hp_m(t) = U\{hw_i(T)\} - U\{hw_i(T) \cap hw_j(T)\} + U\{hw_i(T) \cap hw_j(T) \cap hw_k(T)\} - \pm \ldots$$

During the matching phase the polygons in HPolygons(T) are superimposed on HLines(A) obtaining the scores HScore(A). The similarity between A and T is determined by the difference in the values of HScore(T) and HScore(A). More specifically, the difference between two forms is measured with the following formula:

$$Diff(A,T) = (\Sigma(hs_m(T) - hs_m(A))^2 / \Sigma(hs_m(T))^2)^{\frac{1}{2}}$$

The values of this function are always in the range [0.0,1.0]; with 0 representing a perfect match, and 1 a total mismatch. A candidate $T_1$ is accepted if and only if the value $Diff(A,T_1)$ is below a given acceptance threshold.

3.6 Decision Function

This section describes the last step in the matching process. This step uses the partial results of the discrimination tests. These values, representing how close a template matches the form being recognized, are computed by subtracting 1 from the form-to-template ratio of the values being tested, then taking the absolute value. For example, the elimination of a template based on the line count involves dividing the number of lines in the template, say $LC_t$, by the number of lines in the actual form, say $LC_a$. The error for this test is $|1 - LC_t/LC_a|$. Notice that a ratio of 1 is a perfect match and yields an error value equal to 0.

The decision function simply takes a weighted average of the resulting errors, orders the candidates according to these values, then selects the candidate on the top of the list. The error values involved are:
LC_E: Line count ratio error
LW_E: Line weight ratio error
FCC_E: Form center crossing ratio error
IC_E: Intersection count ratio error
APP_E: Approximation ratio error
PROJ_E: Projection ratio error
WIN_E: Window error
These quantities are weighted as follows:
$W_1(LC\_E + LW\_E + FCC\_E + IC\_E) + W_2APPR\_R + W_3PROJ\_R + W_4WIN\_E$ where $\{W_i\}$ is a set of constant such that $'W_i = 1$. These values can be arbitrarily set to tune the performance of the system, it is expected that the values of $W_4$ will carry more weight than the rest, since the window test is more detailed. Similarly the following relationship should be preserved $W_3 < W_2 W_1$.

4. Form Dictionary

The form dictionary is the repository of the information needed to support the matching process. Its contents, and organization, are thus dictated by the needs of the matching algorithm. In general, the dictionary should be organized in a hierarchical fashion, with the aggregate values placed in a readily available header. More detailed information, such as that needed for the projection or line-based methods, should be placed further down the hierarchy, and retrieved only when necessary.

The process of training the dictionary involves gathering forms representative of their classes, scanning them, and extracting their features. This task is to be performed under the supervision of a user who will determine class names or keys.

5. Performance Evaluation

This section presents the results of tests performed with the form recognition system in order to determine its accuracy. It briefly describes the test environment, then discusses the critical parameters in the system and their effect on its efficiency.

The form recognition system discussed has been implemented in a UNIX/C environment at Ricoh Corporation's Software Research Center. The main programs of the system are: (1) a classification program which, given a form image and a form dictionary, returns the form id or a NO_MATCH flag; and (2) a training program which adds the features of a template form to a given dictionary. Two auxiliary programs complement the system. One creates the structures needed in the form dictionary, the other is an interactive tool which displays partial results of the matching process for debugging or parameter setting purposes.

There are four characteristics of scanned images forms that affect the way in which they are recognized: (1) skewing or rotation; (2) the threshold value used in the binarization process (contrast); (3) the background noise created by impurities in the scanning mechanism; and (4) the presence of text and/or signatures. On the other hand, there are several parameters that can be used to adjust the operation of the system. The testing methodology described next has been used to identify the critical thresholds in the system, and their most suitable values.

The form recognition system was tested using 150 letter-size template forms copied from [9], scanned at 200 dpi, with 2176 lines of 1672 pixels. The system was initially tested with 200 forms filled manually. However, a thorough evaluation of the system required the creation of a series of test forms combining the characteristics of interest. These forms were generated automatically using the template stored in the dictionary and image processing functions that added objects and noise to the image.

Table 1 illustrates the variables used in the process. All combinations were considered. However, they were divided into two categories as follows:

| Category | Rotation | Translation | Contrast |
|---|---|---|---|
| 1 | D | C,D,E | C |
| 2 | B,C,E,F | B,C,E,F | B,D |

The purpose of these grouping is to simulate images obtained from originals (category 1), and from first copies (category 2).

TABLE 1

Test Generation Parameters.

| | | | | | | |
|---|---|---|---|---|---|---|
| (1) Rotation: | −3 (B) | 1 (C) | 0 (D) | +1 (E) | +3 (F) | (degrees) |
| (2) Translation: | −24 (B) | −8 (C) | 0 (D) | +8 (E) | +24 (F) | (pixels) |
| (3) Contrast: | (B) light | | | | | |
| | (C) normal | | | | | |
| | (D) dark | | | | | |

The results of the tests conducted with these categories were 99.78% and 97.32% respectively. In addition, the same forms were modified to include stamps commonly found in business forms (e.. "FAXED", "OK TO PAY", "CONFIDENTIAL", . . . ). The presence of these foreign objects had a significant impact on the accuracy of the system, reducing the observed accuracy to 96.2% and 90.38%. The reason for this drop was the presence of lines in the stamps themselves, as well as the noise they created when superimposed on the real document lines. The parameter values used in these tests were obtained through a series of experiments in which the sensitivity of different parameter groups was analyzed.

Figure 11:
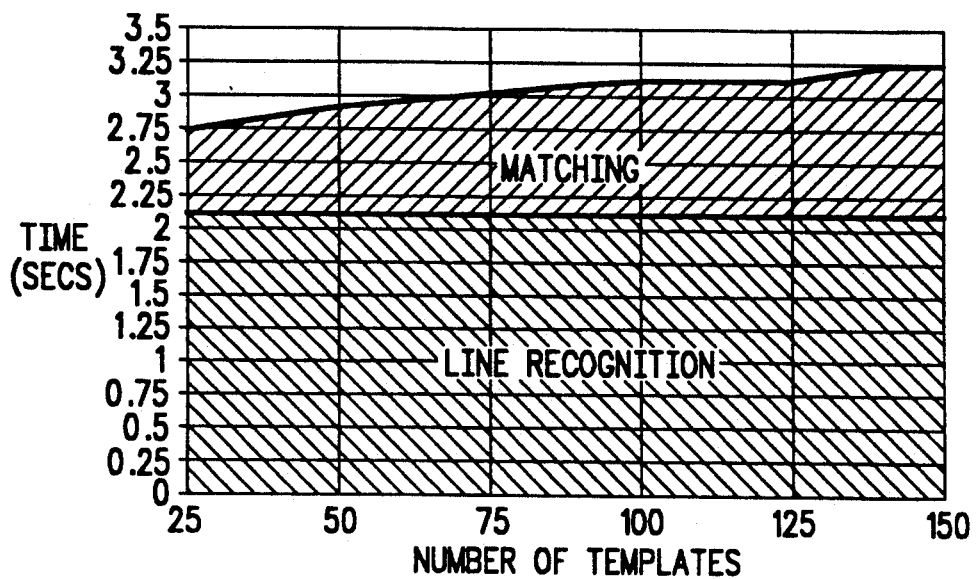
FIG. 11 depicts recognition time.

The speed of the system was determined through a separate group of tests in which 100 forms were run against dictionaries of different sizes. The results are illustrated in FIG. 11. In this figure the average time spend in each form is divided into two parts: one corresponding to line recognition and the other to matching. The average line recognition time was measured separately. Times were measured on a Sun Microsystem's SparcStation 1.

Finally, a study of the percentage of forms discarded at each step of the matching process yielded the results shown in Table 2. These figures give an indication of the efficiency of each method when considered separately.

TABLE 2

Individual Discrimination Rates.

| | |
|---|---|
| Initial Discrimination | 37.63% |
| Aggregate Discrimination | 48.18% |
| Intersection Discrimination | 58.48% |
| Approximation Discrimination | 70.94% |
| Projection Discrimination | 84.72% |
| Selection of Best Candidates | 84.77% |
| Window Matching | 99.57% |

6. Conclusions

The form recognition system can be used in the development of document imaging systems that must deal with different form formats simultaneously.

The system has been tested under a variety of conditions, and as shown in section 5, its performance has been proven to be satisfactory.

It is anticipated that this system may be coupled with either typewritten or handwritten OCR to enable forms to be not only classified, but also uniquely identified. A successful combination of these technologies should yield a powerful and flexible indexing mechanism for document image management systems.

7. Connected Component Identification

Figure 12:
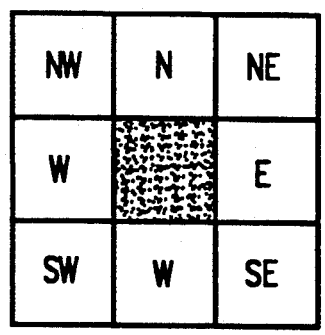
FIG. 12 depicts a diagram of 8-connected neighbors.

The identification of connected components involves grouping contiguous black pixels into sets. Two pixels are said to be contiguous if they are 8-connected: see FIG. 12. The technique used to find connected components involves scanning the image line by line, then "growing" and "merging" black pixels into objects. The process is better described by the following example.

Figures 13A, 13B, 13C, 13D, 13E:
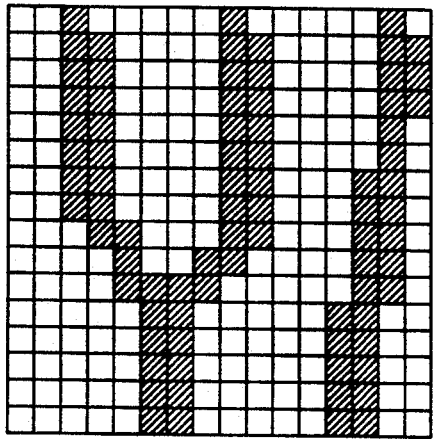
FIGS. 13(a)–(e) depict a connected component identification process.

Consider the binary matrix shown in FIG. 13a, and assume it represents the pixel arrangement of an image. The connected component identification process uses an array of markers to keep track of pixel object relationships. This array associates each pixel with an integer number that identifies a set. During the marking process the image is read line by line and left to right. There is no pixel look-ahead, hence the connectivity of a pixel is determined only with respect to its W, NW, N and NE neighbors. Marker values are determined as follows:

1 all white-pixels are marked with a zero.
1. if a black-pixel is not connected to its neighbors it is assigned a new marker number. FIG. 13b shows the marker values after the first line in is scanned.
3. if a black-pixel is connected to one or more black-pixels associated with the same marker, it receives the same number: FIG. 13c shows marker values after the tenth line.
4. if a black-pixel is connected to two components with different marker numbers the objects are merged. During this process the markers associated with the components with the largest number are changed to the lowest: FIG. 13d illustrates the merging of markers 1 and 2.

The marker matrix that results after all the lines have been scanned describes all the connected components in the image; see FIG. 13e.

7.1 Image Compression

The complexity of the algorithm described above, given an image with N lines and M pixels per-line, is N×M. This applies both to the run-time, as well as the memory required. The remainder of this section describes modifications to these basic ideas that result in an algorithm that requires only 2M memory cells, and has 1/16th the run-time complexity.

The run-time complexity of the algorithm can be reduced if the image is scanned byte-by-byte instead of pixel-by-pixel. This compression reduces the number of elements to be processed to N*M/8. It also enables a more efficient implementation of the algorithm, since most I/O and memory management instructions in existing processors operate at the byte-level.

Working at the byte-level requires the information available in eight contiguous pixels to be condensed into a single value. For the purposes of this application, each potential byte value (0 to 255) represents a pattern of ones and zeros. The compression is achieved by mapping those bit patterns most likely to be found in a line segment to '1' and the remainder to zero.

The decision as to which bit-patterns should be mapped to one and which to zero depends on the type of image to be processed. If the images are crisp and not skewed, then only those bytes containing eight consecutive 1's ones (decimal value 255) need to be selected. Conversely, lines in noisy or skewed images will have holes in them, thus requiring that certain bit-patterns containing zeros be accepted.

The current version of the algorithm maps byte-values according to the following formula:

$$\text{SelectByte}(b) = \begin{cases} 1 & \text{if the number of zeros} < 4 \text{ and} \\ & \text{number of contiguous zeros} <= 1; \\ 0 & \text{otherwise.} \end{cases} \quad (1)$$

This rule was selected as a result of experiments conducted on a collection of images with varying sharpness and skewing. During these experiments it was noticed that selecting patterns based only on the number of black pixels yielded poor results in noisy images, where the lines were likely to have a "porous" texture. On the other hand, cases where patterns with two or more contiguous zeros were mapped to 1, resulted in situations in which contiguous text elements were mistakenly identified as lines.

Since the length of a typical form line is expected to exceed two bytes (about 1/12th of an inch if the images is scanned at 200 dpi), it is possible to further speed up the algorithm by mapping two contiguous bytes into a single value. This map is defined by the following formula:

$$\text{SelectBytes}(b_1, b_2) = \text{SelectRightByte}(b_1) \text{ AND } \text{SelectLeftByte}(b_2) \quad (2)$$

where SelectRightByte(b) and SelectLeftByte(b) map the decimal value of b according to (1). In addition, the pattern sets {0000111, 0001111, 0011111} and {11100000, 11110000, 11111100} are mapped to one by SelectRightByte and SelectLeftByte respectively. The addition of these patterns to the selection set improves the recognition accuracy for skewed lines. The complete mapping tables are shown in Table A1.

TABLE A1

| Byte Selection Table | | | |
|---|---|---|---|
| Decimal Value | Pixel Pattern | Left Select | Right Select |
| 0 | 00000000 | 0 | 0 |
| 1 | 00000001 | 0 | 0 |
| 2 | 00000010 | 0 | 0 |
| 3 | 00000011 | 0 | 0 |
| 4 | 00000100 | 0 | 0 |
| 5 | 00000101 | 0 | 0 |
| 6 | 00000110 | 0 | 0 |
| 7 | 00000111 | 0 | 0 |
| 8 | 00001000 | 0 | 0 |
| 9 | 00001001 | 0 | 0 |
| 10 | 00001010 | 0 | 0 |
| 11 | 00001011 | 0 | 0 |
| 12 | 00001100 | 0 | 0 |
| 13 | 00001101 | 0 | 0 |
| 14 | 00001110 | 0 | 0 |
| 15 | 00001111 | 1 | 0 |
| 16 | 00010000 | 0 | 0 |
| 17 | 00010001 | 0 | 0 |
| 18 | 00010010 | 0 | 0 |
| 19 | 00010011 | 0 | 0 |
| 20 | 00010100 | 0 | 0 |
| 21 | 00010101 | 0 | 0 |
| 22 | 00010110 | 0 | 0 |
| 23 | 00010111 | 0 | 0 |
| 24 | 00011000 | 0 | 0 |
| 25 | 00011001 | 0 | 0 |
| 26 | 00011010 | 0 | 0 |
| 27 | 00011011 | 0 | 0 |

TABLE A1-continued

| Byte Selection Table | | | |
|---|---|---|---|
| Decimal Value | Pixel Pattern | Left Select | Right Select |
| 28 | 00011100 | 0 | 0 |
| 29 | 00011101 | 0 | 0 |
| 30 | 00011110 | 0 | 0 |
| 31 | 00011111 | 1 | 0 |
| 32 | 00100000 | 0 | 0 |
| 33 | 00100001 | 0 | 0 |
| 34 | 00100010 | 0 | 0 |
| 35 | 00100011 | 0 | 0 |
| 36 | 00100100 | 0 | 0 |
| 37 | 00100101 | 0 | 0 |
| 38 | 00100110 | 0 | 0 |
| 39 | 00100111 | 0 | 0 |
| 40 | 00101000 | 0 | 0 |
| 41 | 00101001 | 0 | 0 |
| 42 | 00101010 | 0 | 0 |
| 43 | 00101011 | 0 | 0 |
| 44 | 00101100 | 0 | 0 |
| 45 | 00101101 | 0 | 0 |
| 46 | 00101110 | 0 | 0 |
| 47 | 00101111 | 1 | 0 |
| 48 | 00110000 | 0 | 0 |
| 49 | 00110001 | 0 | 0 |
| 50 | 00110010 | 0 | 0 |
| 51 | 00110011 | 0 | 0 |
| 52 | 00110100 | 0 | 0 |
| 53 | 00110101 | 0 | 0 |
| 54 | 00110110 | 0 | 0 |
| 55 | 00110111 | 0 | 0 |
| 56 | 00111000 | 0 | 0 |
| 57 | 00111001 | 0 | 0 |
| 58 | 00111010 | 0 | 0 |
| 59 | 00111011 | 0 | 0 |
| 60 | 00111100 | 0 | 0 |
| 61 | 00111101 | 0 | 0 |
| 62 | 00111110 | 0 | 0 |
| 63 | 00111111 | 1 | 0 |
| 64 | 01000000 | 0 | 0 |
| 65 | 01000001 | 0 | 0 |
| 66 | 01000010 | 0 | 0 |
| 67 | 01000011 | 0 | 0 |
| 68 | 01000100 | 0 | 0 |
| 69 | 01000101 | 0 | 0 |
| 70 | 01000110 | 0 | 0 |
| 71 | 01000111 | 0 | 0 |
| 72 | 01001000 | 0 | 0 |
| 73 | 01001001 | 0 | 0 |
| 74 | 01001010 | 0 | 0 |
| 75 | 01001011 | 0 | 0 |
| 76 | 01001100 | 0 | 0 |
| 77 | 01001101 | 0 | 0 |
| 78 | 01001110 | 0 | 0 |
| 79 | 01001111 | 1 | 0 |
| 80 | 01010000 | 0 | 0 |
| 81 | 01010001 | 0 | 0 |
| 82 | 01010010 | 0 | 0 |
| 83 | 01010011 | 0 | 0 |
| 84 | 01010100 | 0 | 0 |
| 85 | 01010101 | 1 | 1 |
| 86 | 01010110 | 1 | 1 |
| 87 | 01010111 | 1 | 1 |
| 88 | 01011000 | 0 | 0 |
| 89 | 01011001 | 0 | 0 |
| 90 | 01011010 | 1 | 1 |
| 91 | 01011011 | 1 | 1 |
| 92 | 01011100 | 0 | 0 |
| 93 | 01011101 | 1 | 1 |
| 94 | 01011110 | 1 | 1 |
| 95 | 01011111 | 1 | 1 |
| 96 | 01100000 | 0 | 0 |
| 97 | 01100001 | 0 | 0 |
| 98 | 01100010 | 0 | 0 |
| 99 | 01100011 | 0 | 0 |
| 100 | 01100100 | 0 | 0 |
| 101 | 01100101 | 0 | 0 |
| 102 | 01100110 | 0 | 0 |
| 103 | 01100111 | 0 | 0 |
| 104 | 01101000 | 0 | 0 |
| 105 | 01101001 | 0 | 0 |

TABLE A1-continued

Byte Selection Table

| Decimal Value | Pixel Pattern | Left Select | Right Select |
| --- | --- | --- | --- |
| 106 | 01101010 | 1 | 1 |
| 107 | 01101011 | 1 | 1 |
| 108 | 01101100 | 0 | 0 |
| 109 | 01101101 | 1 | 1 |
| 110 | 01101110 | 1 | 1 |
| 111 | 01101111 | 1 | 1 |
| 112 | 01110000 | 0 | 0 |
| 113 | 01110001 | 0 | 0 |
| 114 | 01110010 | 0 | 0 |
| 115 | 01110011 | 0 | 0 |
| 116 | 01110100 | 0 | 0 |
| 117 | 01110101 | 1 | 1 |
| 118 | 01110110 | 1 | 1 |
| 119 | 01110111 | 1 | 1 |
| 120 | 01111000 | 0 | 0 |
| 121 | 01111001 | 0 | 0 |
| 122 | 01111010 | 1 | 1 |
| 123 | 01111011 | 1 | 1 |
| 124 | 01111100 | 0 | 0 |
| 125 | 01111101 | 1 | 1 |
| 126 | 01111110 | 1 | 1 |
| 127 | 01111111 | 1 | 1 |
| 128 | 10000000 | 0 | 0 |
| 129 | 10000001 | 0 | 0 |
| 130 | 10000010 | 0 | 0 |
| 131 | 10000011 | 0 | 0 |
| 132 | 10000100 | 0 | 0 |
| 133 | 10000101 | 0 | 0 |
| 134 | 10000110 | 0 | 0 |
| 135 | 10000111 | 0 | 0 |
| 136 | 10001000 | 0 | 0 |
| 137 | 10001001 | 0 | 0 |
| 138 | 10001010 | 0 | 0 |
| 139 | 10001011 | 0 | 0 |
| 140 | 10001100 | 0 | 0 |
| 141 | 10001101 | 0 | 0 |
| 142 | 10001110 | 0 | 0 |
| 143 | 10001111 | 1 | 0 |
| 144 | 10010000 | 0 | 0 |
| 145 | 10010001 | 0 | 0 |
| 146 | 10010010 | 0 | 0 |
| 147 | 10010011 | 0 | 0 |
| 148 | 10010100 | 0 | 0 |
| 149 | 10010101 | 0 | 0 |
| 150 | 10010110 | 0 | 0 |
| 151 | 10010111 | 0 | 0 |
| 152 | 10011000 | 0 | 0 |
| 153 | 10011001 | 0 | 0 |
| 154 | 10011010 | 0 | 0 |
| 155 | 10011011 | 0 | 0 |
| 156 | 10011100 | 0 | 0 |
| 157 | 10011101 | 0 | 0 |
| 158 | 10011110 | 0 | 0 |
| 159 | 10011111 | 1 | 0 |
| 160 | 10100000 | 0 | 0 |
| 161 | 10100001 | 0 | 0 |
| 162 | 10100010 | 0 | 0 |
| 163 | 10100011 | 0 | 0 |
| 164 | 10100100 | 0 | 0 |
| 165 | 10100101 | 0 | 0 |
| 166 | 10100110 | 0 | 0 |
| 167 | 10100111 | 0 | 0 |
| 168 | 10101000 | 0 | 0 |
| 169 | 10101001 | 0 | 0 |
| 170 | 10101010 | 1 | 1 |
| 171 | 10101011 | 1 | 1 |
| 172 | 10101100 | 0 | 0 |
| 173 | 10101101 | 1 | 1 |
| 174 | 10101110 | 1 | 1 |
| 175 | 10101111 | 1 | 1 |
| 176 | 10110000 | 0 | 0 |
| 177 | 10110001 | 0 | 0 |
| 178 | 10110010 | 0 | 0 |
| 179 | 10110011 | 0 | 0 |
| 180 | 10110100 | 0 | 0 |
| 181 | 10110101 | 1 | 1 |
| 182 | 10110110 | 1 | 1 |
| 183 | 10110111 | 1 | 1 |
| 184 | 10111000 | 0 | 0 |
| 185 | 10111001 | 0 | 0 |
| 186 | 10111010 | 1 | 1 |
| 187 | 10111011 | 1 | 1 |
| 188 | 10111100 | 0 | 0 |
| 189 | 10111101 | 1 | 1 |
| 190 | 10111110 | 1 | 1 |
| 191 | 10111111 | 1 | 1 |
| 192 | 11000000 | 0 | 0 |
| 193 | 11000001 | 0 | 0 |
| 194 | 11000010 | 0 | 0 |
| 195 | 11000011 | 0 | 0 |
| 196 | 11000100 | 0 | 0 |
| 197 | 11000101 | 0 | 0 |
| 198 | 11000110 | 0 | 0 |
| 199 | 11000111 | 0 | 0 |
| 200 | 11001000 | 0 | 0 |
| 201 | 11001001 | 0 | 0 |
| 202 | 11001010 | 0 | 0 |
| 203 | 11001011 | 0 | 0 |
| 204 | 11001100 | 0 | 0 |
| 205 | 11001101 | 0 | 0 |
| 206 | 11001110 | 0 | 0 |
| 207 | 11001111 | 1 | 0 |
| 208 | 11010000 | 0 | 0 |
| 209 | 11010001 | 0 | 0 |
| 210 | 11010010 | 0 | 0 |
| 211 | 11010011 | 0 | 0 |
| 212 | 11010100 | 0 | 0 |
| 213 | 11010101 | 1 | 1 |
| 214 | 11010110 | 1 | 1 |
| 215 | 11010111 | 1 | 1 |
| 216 | 11011000 | 0 | 0 |
| 217 | 11011001 | 0 | 0 |
| 218 | 11011010 | 1 | 1 |
| 219 | 11011011 | 1 | 1 |
| 220 | 11011100 | 0 | 0 |
| 221 | 11011101 | 1 | 1 |
| 222 | 11011110 | 1 | 1 |
| 223 | 11011111 | 1 | 1 |
| 224 | 11100000 | 0 | 0 |
| 225 | 11100001 | 0 | 0 |
| 226 | 11100010 | 0 | 0 |
| 227 | 11100011 | 0 | 0 |
| 228 | 11100100 | 0 | 0 |
| 229 | 11100101 | 0 | 0 |
| 230 | 11100110 | 0 | 0 |
| 231 | 11100111 | 0 | 0 |
| 232 | 11101000 | 0 | 0 |
| 233 | 11101001 | 0 | 0 |
| 234 | 11101010 | 1 | 1 |
| 235 | 11101011 | 1 | 1 |
| 236 | 11101100 | 0 | 0 |
| 237 | 11101101 | 1 | 1 |
| 238 | 11101110 | 1 | 1 |
| 239 | 11101111 | 1 | 1 |
| 240 | 11110000 | 0 | 1 |
| 241 | 11110001 | 0 | 1 |
| 242 | 11110010 | 0 | 1 |
| 243 | 11110011 | 0 | 1 |
| 244 | 11110100 | 0 | 1 |
| 245 | 11110101 | 1 | 1 |
| 246 | 11110110 | 1 | 1 |
| 247 | 11110111 | 1 | 1 |
| 248 | 11111000 | 0 | 1 |
| 249 | 11111001 | 0 | 1 |
| 250 | 11111010 | 1 | 1 |
| 251 | 11111011 | 1 | 1 |
| 252 | 11111100 | 0 | 1 |
| 253 | 11111101 | 1 | 1 |
| 254 | 11111110 | 1 | 1 |
| 255 | 11111111 | 1 | 1 | complete mapping tables are shown in Table A1.

7.1.1 Connected Component Table

The methodology described at the beginning of the section relies on a marker matrix to keep track of all the pixels in a connected component set. While this approach provides an accurate representation of each object, this description still contains excessive data, and therefore its usefulness is limited. This section introduces an alternative connected component representation, and presents an algorithm for its computation.

A common way of describing connected components in an image is through the coordinates of the smallest rectangle that contains all the pixels in the set. This representation is particularly suitable to describe lines, since the features of interest are only the beginning and points. For the purposes of this work, these rectangles will be referred to as minimum enclosing rectangles (MER), and will be described by tuples of the form (minX, maxX, minY, maxY); see FIG. 14.

The use of MERs to describe connected components eliminates the need for the M×N marker matrix. Instead, it is sufficient to have a 2N matrix in which to keep track of the marker values in the current and previous image rows, and a connected component table containing the MER coordinates for the objects identified. The following C-like structure describes this table:

```
typedef struct    {
    short         id;
    short         minX;
    short         maxX;
    short         minY;
    short         maxY;
    u_char        obj;
    u_char        thin;
    u_char        line;
} CComponent;
```

The use of the last three members is described later in the section.

MER coordinates are updated line by line by comparing the value stored in the table with the current position of the image cursor. The process works as follows. Let (x,y) be the current position of the image cursor, and assume that it points to a pair of bytes satisfying (2). Also assume that one of its 4-neighbors (W,NW,N,NE) belongs to the connected component i, described by the MER (minX(i), maxX(i), minY(i), maxY(i)). The new MER coordinates of i are computed as follows:

$$minX(i) = min(x, minX(i))$$

$$maxX(i) = max(x, maxX(i))$$

$$minY(i) = min(y, minY(i))$$

$$maxY(i) = max(y, maxY(i)) \qquad (3)$$

If the neighbors of (x,y) are associated with two different connected components, say i and j, the objects need to be merged. Let (minX(i), maxX(i), minY(i), maxY(I)) and (minX(j), maxX(j), minY(j), maxY(j)) be the respective MERs, and assume that id(i)<id(j). The following compositions take place during the merging process:

$$id(j) = id(i)$$

$$minX(i) = min(minX(i), minX(j))$$

$$maxX(i) = max(maxX(i), maxX(j))$$

$$minY(i) = min(minY(i), minY(j))$$

$$maxY(i) = max(maxY(i), maxY(j)) \qquad (4)$$

Notice that the values of j's MER remain unchanged, and so does id(i).

This section concludes with the merging example shown in FIG. 15. It illustrates the changes that occur in the connected component table at selected points during the processing of an image. This image is assumed to be already compressed.

7.1.2 Line Separation

Figure 16A:
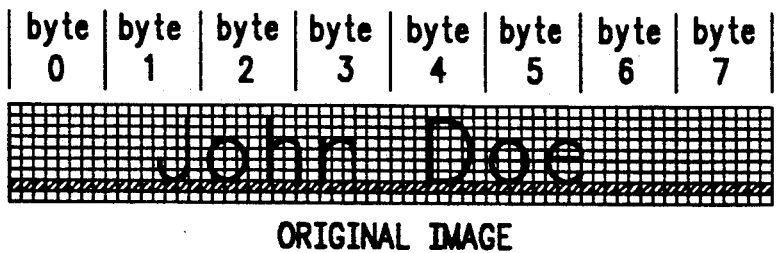
FIGS. 16(a)–(b) depict horizontal line separation during compression.
Figure 16B:
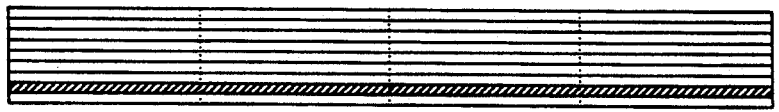

This section discusses the ability of the compression mechanism to separate horizontal lines from its surrounding objects. The byte mapping criteria defined in formulas (1) and (2) eliminates many of the thin strokes that characterize typical vertical lines and text. As a result, the horizontal lines in the image are automatically separated from other objects, even in cases where their patterns are touching; see FIG. 16.

Figure 17A:
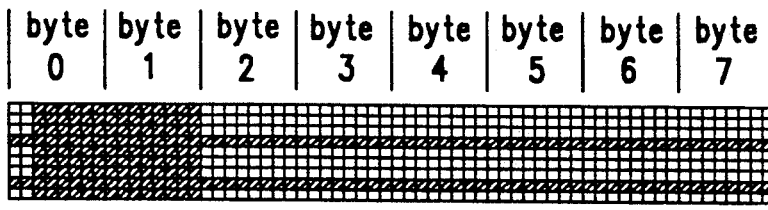
FIGS. 17(a)–(c) depict thick vertical component processing.
Figure 17B:

While the separation occurs in most cases, there are forms containing logos, large text, or frames, whose thick black-pixel patterns elude elimination during the compression step; see FIG. 17. In this cases it is necessary to alter the selectivity criterion of (2) to ensure that the connected component identification phase yields only thin, elongated objects, likely to be line segments. This modification is reflected in the following rule:

Rule 1: A pair of bytes p1 satisfying (2) and 8-connected to a pair of bytes p2, also satisfying (2), is mapped to 1 during the compression process, if and only if, the length of the object associated with p2 is increased by the addition of p1.

Figure 17C:
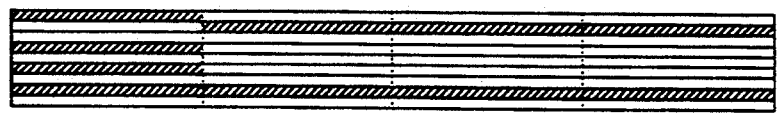

The purpose of this rule is to distinguish line segments that contribute to the overall length of the line, e.g. the bytes at positions (3,0)–(3,7) and (8,0)–(8,7) in FIG. 17a, from those that simply add to its thickness, e.g. bytes (0,0)–(0,2), (0-4)–(0,6) and (0,8). FIG. 17c shows the image that results when the rule is incorporated to the compression mechanism. Notice that because of this rule, it is no longer possible to keep track of all the pixels that composed a horizontal lines. This is an acceptable trade-off as explained in the following section.

7.2 Thin Object Selection

The result of the connected component analysis presented in the previous section is a collection of minimum enclosing rectangles that describe objects in the image. This section introduces the selection criteria used to separate line segments from this set.

Selecting thin objects involves measuring the height, width, and height-to-width ratio of the connected components, then comparing these values to predefined threshold values. The tests performed are:

(height<MAX_THICKNESS AND
ratio>MIN_RATIO)

OR (width>HOR_SEG_LEN)                         (5)

if the line is horizontal, or:

(width<MAX_THICKNESS AND
ratio>MIN_RATIO)

OR (height>VER_SEG_LEN)                        (6)

if the line is vertical. The first part of these conditions is designed to ensure that the objects selected have an elongated geometry. The second part is intended to eliminate connected components corresponding to small line segments generated by large text, logos or noise.

Connected components that satisfy (5) or (6) are considered line segments. This fact is recorded by setting the value of the "thin" variable in the connected component table to one.

The discussion of the parameter values used in the current implementation of the algorithm is deferred to section 7.4.

7.3 Line Merging

After the thin object selection process, the connected component table will contain a collection of minimum enclosing rectangles that describe line segments in the image. In principle, these objects match the lines in the image. However, the presence of noise or skewing often result in lines that are not recognized as a single piece. This section describes a merging algorithm that analyzes groups of neighboring line segments and determines if they are part of the same line.

There are two tests involved in the method: proximity and continuity. The purpose of the proximity test is to eliminate line segments that are too far apart to be considered part of the same line. It involves computing the horizontal distance between two consecutive line segments and comparing it to a threshold. If the lines pass the test, the merging process performs the continuity test, otherwise the segments ar considered separate lines.

Let $$M_i = abs((maxX(LS_i) - minX(LS_i))/2)$$

and $$M_j = abs((maxX(LS_j) - minX(LS_j))/2)$$

be the middle points of two segments $LS_i$ and $LS_j$. c The following formula can be used to perform the proximity test:

```
WithinSearchRange(LS_i,LS_j) =
    TRUE    if abs( (M_i - M_j)/2 ) < MAX_DISTANCE
    FALSE   otherwise                                    (7)
```

Figure 18:
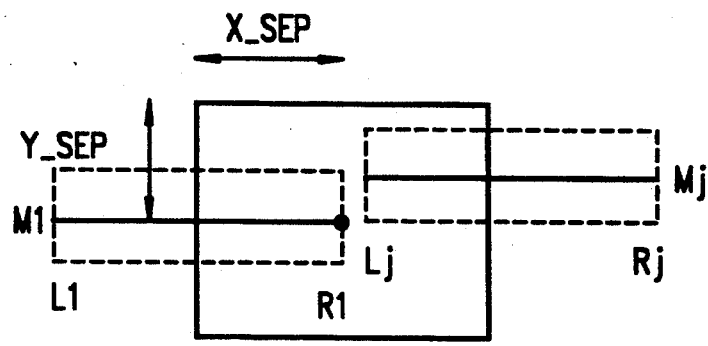
FIG. 18 depicts a continuity test.

The continuity test takes a closer look at two neighboring line segments and determines if they are in fact part of the same line. The test involves checking whether the leftmost and rightmost points of the candidates for merging are located within the same neighborhood. Notice that for every two segments, there are two combinations of leftmost/rightmost points to be considered. The test must be performed on the closest pair. The following algorithm implements the continuity test; see FIG. 18.

```
Algorithm: contiguity test
Definitions:
    Let LS_i and LS_j be two line segments, and assume,
                                 without loss of generality,
                                 that LS_i is to the left of
                                 LS_j.
    Let L_i = minX(LS_i)
```

```
              R_i = maxX(LS_i)
              M_i = (maxY(LS_i) - minY(LS_i))/2
              L_j = minX(LS_j)
              R_j = maxX(LS_j)
              M_j = (maxY(LS_j) - minY(LS_j))/2
Step 1:   Create a window W around (R_i,M_i) as follows.
              minX(W) = R_i - X_SEP
              maxX(W) = R_i - X_SEP
              minY(W) = M_i - Y_SEP
              maxY(W) = M_i - Y_SEP
Step 2:   Peform the test by checking whether (L_j, M_j) is
          inside W or not.
    Contiguous(LS_i,LS_j) =
    TRUE    if L_j > maxX(W)  /* outside to the right */
            or L_j < minX(W)  /* outside to the left  */
            or M_j > minY(W)  /* outside above        */
            or M_j < minY(W)  /* outside below        */
    FALSE   otherwise                                    (8)
```

The complete merging algorithm is sketched next.

```
Algorithm line segment merging
Definitions
          Let LS = {LS_i} be the set of line segments
          Let N be the cardinality of LS
Step 1    Sort LS according to the value of the middle
          vertical point
Step 2    Perform the following computations
          i=0; j=1; merge_count=0;
          while (i<N) {
              while (WithinSearchRange(LS_i,LS_j)) {
                  if (Contiguous(LS_i,LS_j))
                      CombineSegments(LS_i,LS_j);
                      merge_count = +1;
                  j = +1;
              }
              i = +1;
          }
Step 3    If merge_count=0 terminate;
          otherwise let N=N-merge_count then go to 2
```

The function CombineSegments performs the following computations:

$$id(LS_j) = id(LS_i)$$

$$minX(LS_i) = min(minX(LS_i), minX(LS_j))$$

$$maxX(LS_i) = max(maxX(i), maxX(LS_j))$$

$$minY(LS_i) = min(minY(LS_i, minY(LS_j))$$

$$maxY(i) = max(maxY(LS_i), maxY(LS_j)) \qquad (9)$$

7.4 Post Processing

This section describes a series of rules applied to the lines identified in the merging process, to determine whether they satisfy the properties of those found in typical business forms. The purpose of these rules is to eliminate image objects erroneously identified as lines. These objects may be the result of image noise, or may appear in logos or large text.

There are three tests performed on the line table that results from the merging process. They are based on the following criteria: (1) minimum line length; (2) minimum line separation; (3) line intersection.

Figure 19:
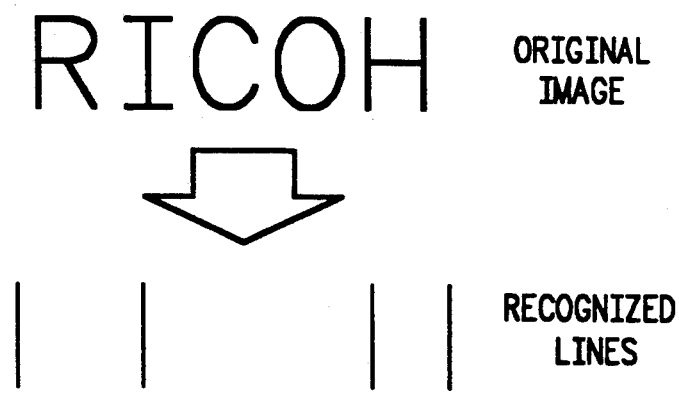
FIG. 19 depicts sample lines found in large text or logos.

The minimum line length test is used to eliminate small lines extracted from large text or logos; see FIG. 19. It involves a simple comparison of line lengths and a threshold (MIN_HOR_LINE_LEN). The test is based on the observation that the design of most business forms uses regular lines to define spaces where data can be entered, or to highlight the areas that compose the document. They should be long enough to be noticeable by the human eye.

The minimum line separation test involves measuring the distance between the Y-coordinates of two consecutive horizontal lines (X-coordinates if the lines are vertical), and comparing it to a threshold (MIN_LINE_SEPARATION). If this criterion is met, and the lines overlap at least MIN_OVERLAP units, the shortest of the two lines is discarded.

The purpose of this test is to eliminate noise generated images observed in the text portion of images that have been scanned with a dark contrast. This test is based on the fact that the lines in business forms are intended primarily as field delimiters, and therefore should maintain a minimum separation to allow data to be entered in between.

Figure 20:
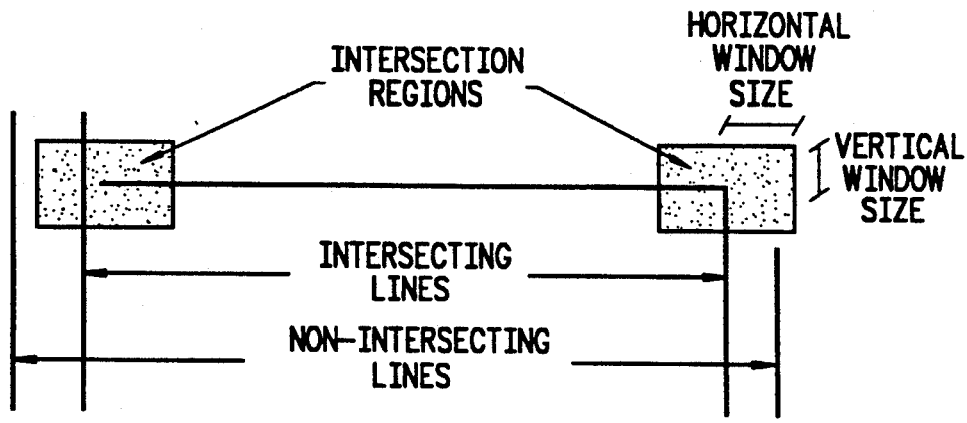
FIG. 20 depicts intersection windows.

Another way of eliminating noise-generated lines is through the intersection test. This test requires that all lines longer than the minimum line length (MIN_HOR_LINE_LENGTH), but shorter than a second length criterion (MIN_NO_INTERSECTION_LENGTH), intersect or form a vertex with at least one perpendicular line. In order to accommodate cases where the recognized lines do not actually touch, but are close enough to assume that in the actual form they do, the test is satisfied as long as the lines reside with in the same neighborhood. This neighborhood is defined around the edges of the horizontal lines; see FIG. 20.

8. Implementation and Testing

This section describes the experiences gathered during the implementation of the algorithm. It briefly describes the development environment, then it presents the results of qualitative and quantitative tests performed to date.

8.1 Environment

The line recognition algorithm described has been implemented as a module of the form recognition system developed at Ricoh's California Research Center. The main function of this module, called lrRecognizeLines, takes a pointer to a digitized business form image, and returns a structure containing the coordinates of the regular lines found. There are two modes of operation in the line recognition module. In normal mode the program identifies the lines and generates the resulting table without producing any output. In debug mode, the library calls generate a collection of messages that show the results of intermediate steps in the algorithm. The tables shown in Appendix B were obtained in this way. Tables B1 though B8 illustrate the operation of this algorithm when applied to an actual image.

TABLE B1

| OBJ # | O | T | L | REAL | Connected Components ||||| WIDTH | HEIGHT | RATIO |
| | | | | | UP | LEFT | DOWN | RIGHT | | | |
| --- | --- | --- | --- | --- | --- | --- | --- | --- | --- | --- | --- |
| 00001 | 1 | 1 | 0 | 00001 | 00054 | 00069 | 00055 | 00157 | 00712 | 000002 | 356.00 |
| 00005 | 1 | 0 | 0 | 00005 | 00093 | 00083 | 00093 | 00085 | 00024 | 000001 | 24.00 |
| 00006 | 1 | 1 | 0 | 00006 | 00093 | 00087 | 00093 | 00091 | 00040 | 000001 | 40.00 |
| 00007 | 1 | 1 | 0 | 00007 | 00093 | 00095 | 00093 | 00099 | 00040 | 000001 | 40.00 |
| 00008 | 1 | 1 | 0 | 00008 | 00093 | 00105 | 00093 | 00111 | 00056 | 000001 | 56.00 |
| 00009 | 1 | 1 | 0 | 00009 | 00093 | 00119 | 00093 | 00123 | 00040 | 000001 | 40.00 |
| 00010 | 1 | 1 | 0 | 00010 | 00093 | 00139 | 00093 | 00143 | 00040 | 000001 | 40.00 |
| 00011 | 1 | 0 | 0 | 00011 | 00095 | 00137 | 00095 | 00139 | 00024 | 000001 | 24.00 |
| 00012 | 1 | 0 | 0 | 00012 | 00096 | 00103 | 00096 | 00105 | 00024 | 000001 | 24.00 |
| 00013 | 1 | 0 | 0 | 00013 | 00097 | 00127 | 00097 | 00129 | 00024 | 000001 | 24.00 |
| 00014 | 1 | 0 | 0 | 00014 | 00100 | 00093 | 00100 | 00095 | 00024 | 000001 | 24.00 |
| 00015 | 1 | 0 | 0 | 00015 | 00100 | 00117 | 00100 | 00119 | 00024 | 000001 | 24.00 |
| 00016 | 1 | 0 | 0 | 00016 | 00100 | 00143 | 00100 | 00145 | 00024 | 000001 | 24.00 |
| 00017 | 1 | 0 | 0 | 00017 | 00101 | 00081 | 00101 | 00083 | 00024 | 000001 | 24.00 |
| 00018 | 1 | 0 | 0 | 00018 | 00101 | 00131 | 00101 | 00133 | 00024 | 000001 | 24.00 |
| 00019 | 1 | 0 | 0 | 00019 | 00106 | 00089 | 00106 | 00091 | 00024 | 000001 | 24.00 |
| 00020 | 1 | 0 | 0 | 00020 | 00106 | 00123 | 00106 | 00125 | 00024 | 000001 | 24.00 |
| 00021 | 1 | 0 | 0 | 00021 | 00107 | 00085 | 00107 | 00087 | 00024 | 000001 | 24.00 |
| 00022 | 1 | 0 | 0 | 00022 | 00108 | 00107 | 00108 | 00109 | 00024 | 000001 | 24.00 |
| 00023 | 1 | 0 | 0 | 00023 | 00108 | 00137 | 00108 | 00139 | 00024 | 000001 | 24.00 |
| 00024 | 1 | 0 | 0 | 00024 | 00111 | 00127 | 00111 | 00129 | 00024 | 000001 | 24.00 |
| 00025 | 1 | 0 | 0 | 00025 | 00113 | 00117 | 00113 | 00119 | 00024 | 000001 | 24.00 |
| 00026 | 1 | 0 | 0 | 00026 | 00119 | 00135 | 00119 | 00137 | 00024 | 000001 | 24.00 |
| 00027 | 1 | 0 | 0 | 00027 | 00120 | 00101 | 00120 | 00103 | 00024 | 000001 | 24.00 |
| 00028 | 1 | 0 | 0 | 00028 | 00121 | 00089 | 00121 | 00091 | 00024 | 000001 | 24.00 |
| 00029 | 1 | 0 | 0 | 00029 | 00121 | 00097 | 00121 | 00099 | 00024 | 000001 | 24.00 |
| 00030 | 1 | 0 | 0 | 00030 | 00121 | 00105 | 00121 | 00107 | 00024 | 000001 | 24.00 |
| 00031 | 1 | 0 | 0 | 00031 | 00121 | 00111 | 00121 | 00113 | 00024 | 000001 | 24.00 |
| 00032 | 1 | 1 | 0 | 00032 | 00121 | 00119 | 00122 | 00123 | 00040 | 000002 | 20.00 |
| 00033 | 1 | 0 | 0 | 00033 | 00121 | 00125 | 00121 | 00127 | 00024 | 000001 | 24.00 |
| 00034 | 1 | 0 | 0 | 00034 | 00121 | 00129 | 00121 | 00131 | 00024 | 000001 | 24.00 |
| 00035 | 1 | 1 | 0 | 00035 | 00121 | 00137 | 00121 | 00145 | 00072 | 000001 | 72.00 |
| 00036 | 1 | 1 | 0 | 00036 | 00153 | 00069 | 00154 | 00157 | 00712 | 000002 | 356.00 |
| 00037 | 1 | 0 | 0 | 00037 | 00187 | 00081 | 00187 | 00083 | 00024 | 000001 | 24.00 |
| 00038 | 1 | 1 | 0 | 00038 | 00192 | 00075 | 00192 | 00079 | 00040 | 000001 | 40.00 |
| 00039 | 1 | 1 | 0 | 00039 | 00193 | 00089 | 00193 | 00095 | 00056 | 000001 | 56.00 |
| 00040 | 1 | 0 | 0 | 00040 | 00196 | 00075 | 00196 | 00077 | 00024 | 000001 | 24.00 |
| 00041 | 1 | 0 | 0 | 00041 | 00203 | 00075 | 00203 | 00077 | 00024 | 000001 | 24.00 |
| 00042 | 1 | 0 | 0 | 00042 | 00203 | 00081 | 00203 | 00083 | 00024 | 000001 | 24.00 |
| 00043 | 1 | 0 | 0 | 00043 | 00203 | 00085 | 00203 | 00087 | 00024 | 000001 | 24.00 |
| 00044 | 1 | 1 | 0 | 00044 | 00211 | 00103 | 00211 | 00139 | 00296 | 000001 | 296.00 |
| 00045 | 1 | 0 | 0 | 00045 | 00241 | 00091 | 00241 | 00093 | 00024 | 000001 | 24.00 |
| 00046 | 1 | 0 | 0 | 00046 | 00241 | 00097 | 00241 | 00099 | 00024 | 000001 | 24.00 |
| 00047 | 1 | 0 | 0 | 00047 | 00243 | 00081 | 00243 | 00083 | 00024 | 000001 | 24.00 |
| 00048 | 1 | 0 | 0 | 00048 | 00251 | 00089 | 00251 | 00091 | 00024 | 000001 | 24.00 |
| 00049 | 1 | 1 | 0 | 00049 | 00259 | 00103 | 00259 | 00139 | 00296 | 000001 | 296.00 |

TABLE B1-continued

| OBJ # | O | T | L | REAL | Connected Components | | | | WIDTH | HEIGHT | RATIO |
| --- | --- | --- | --- | --- | --- | --- | --- | --- | --- | --- | --- |
| | | | | | UP | LEFT | DOWN | RIGHT | | | |
| 00050 | 1 | 1 | 0 | 00050 | 00317 | 00025 | 00319 | 00125 | 00808 | 000003 | 269.33 |
| 00051 | 1 | 1 | 0 | 00051 | 00317 | 00137 | 00319 | 00199 | 00504 | 000003 | 168.00 |
| 00054 | 1 | 0 | 0 | 00054 | 00341 | 00027 | 00341 | 00029 | 00024 | 000001 | 24.00 |
| 00055 | 1 | 1 | 0 | 00055 | 00341 | 00039 | 00342 | 00043 | 00040 | 000002 | 20.00 |
| 00056 | 1 | 1 | 0 | 00056 | 00343 | 00139 | 00343 | 00143 | 00040 | 000001 | 40.00 |
| 00057 | 1 | 1 | 0 | 00057 | 00343 | 00151 | 00343 | 00155 | 00040 | 000001 | 40.00 |
| 00058 | 1 | 0 | 0 | 00058 | 00344 | 00145 | 00344 | 00147 | 00024 | 000001 | 24.00 |
| 00059 | 1 | 0 | 0 | 00059 | 00348 | 00029 | 00348 | 00031 | 00024 | 000001 | 24.00 |
| 00060 | 1 | 1 | 0 | 00060 | 00350 | 00139 | 00350 | 00143 | 00040 | 000001 | 40.00 |
| 00061 | 1 | 0 | 0 | 00061 | 00350 | 00151 | 00350 | 00153 | 00024 | 000001 | 24.00 |
| 00062 | 1 | 0 | 0 | 00062 | 00351 | 00039 | 00351 | 00041 | 00024 | 000001 | 24.00 |
| 00063 | 1 | 0 | 0 | 00063 | 00355 | 00139 | 00355 | 00141 | 00024 | 000001 | 24.00 |
| 00064 | 1 | 0 | 0 | 00064 | 00357 | 00037 | 00357 | 00039 | 00024 | 000001 | 24.00 |
| 00065 | 1 | 0 | 0 | 00065 | 00358 | 00031 | 00358 | 00033 | 00024 | 000001 | 24.00 |
| 00066 | 1 | 0 | 0 | 00066 | 00359 | 00141 | 00359 | 00143 | 00024 | 000001 | 24.00 |
| 00067 | 1 | 0 | 0 | 00067 | 00359 | 00147 | 00359 | 00149 | 00024 | 000001 | 24.00 |
| 00068 | 1 | 1 | 0 | 00068 | 00359 | 00151 | 00359 | 00155 | 00040 | 000001 | 40.00 |
| 00069 | 1 | 1 | 0 | 00069 | 00384 | 00025 | 00386 | 00125 | 00808 | 000003 | 269.33 |
| 00071 | 1 | 1 | 0 | 00071 | 00385 | 00137 | 00386 | 00199 | 00504 | 000002 | 252.00 |
| 00074 | 1 | 0 | 0 | 00074 | 00399 | 00027 | 00399 | 00029 | 00024 | 000001 | 24.00 |
| 00075 | 1 | 0 | 0 | 00075 | 00400 | 00139 | 00400 | 00141 | 00024 | 000001 | 24.00 |
| 00076 | 1 | 1 | 0 | 00076 | 00404 | 00055 | 00404 | 00059 | 00040 | 000001 | 40.00 |
| 00077 | 1 | 0 | 0 | 00077 | 00405 | 00031 | 00405 | 00033 | 00024 | 000001 | 24.00 |
| 00078 | 1 | 1 | 0 | 00078 | 00410 | 00027 | 00411 | 00033 | 00056 | 000002 | 28.00 |
| 00079 | 1 | 0 | 0 | 00079 | 00411 | 00059 | 00411 | 00061 | 00024 | 000001 | 24.00 |
| 00080 | 1 | 0 | 0 | 00080 | 00411 | 00185 | 00411 | 00187 | 00024 | 000001 | 24.00 |
| 00081 | 1 | 0 | 0 | 00081 | 00412 | 00081 | 00412 | 00083 | 00024 | 000001 | 24.00 |
| 00082 | 1 | 1 | 0 | 00082 | 00412 | 00139 | 00413 | 00143 | 00040 | 000002 | 20.00 |
| 00083 | 1 | 0 | 0 | 00083 | 00425 | 00061 | 00425 | 00063 | 00024 | 000001 | 24.00 |
| 00084 | 1 | 0 | 0 | 00084 | 00425 | 00173 | 00425 | 00175 | 00024 | 000001 | 24.00 |
| 00085 | 1 | 0 | 0 | 00085 | 00428 | 00173 | 00428 | 00175 | 00024 | 000001 | 24.00 |
| 00086 | 1 | 0 | 0 | 00086 | 00433 | 00055 | 00433 | 00057 | 00024 | 000001 | 24.00 |
| 00087 | 1 | 1 | 0 | 00087 | 00446 | 00025 | 00447 | 00125 | 00808 | 000002 | 404.00 |
| 00088 | 1 | 1 | 0 | 00088 | 00446 | 00137 | 00447 | 00199 | 00504 | 000002 | 252.00 |

TABLE B2

Thin Objects Selected

| OBJ # | REAL # | UP | LEFT | DOWN | RIGHT | WIDTH | HEIGHT | RATIO |
| --- | --- | --- | --- | --- | --- | --- | --- | --- |
| 00001 | 00001 | 00054 | 00069 | 00055 | 00157 | 00712 | 000002 | 356.00 |
| 00006 | 00006 | 00093 | 00087 | 00093 | 00091 | 00040 | 000001 | 40.00 |
| 00007 | 00007 | 00093 | 00095 | 00093 | 00099 | 00040 | 000001 | 40.00 |
| 00008 | 00008 | 00093 | 00105 | 00093 | 00111 | 00056 | 000001 | 56.00 |
| 00009 | 00009 | 00093 | 00119 | 00093 | 00123 | 00040 | 000001 | 40.00 |
| 00010 | 00010 | 00093 | 00139 | 00093 | 00143 | 00040 | 000001 | 40.00 |
| 00032 | 00032 | 00121 | 00119 | 00122 | 00123 | 00040 | 000002 | 20.00 |
| 00035 | 00035 | 00121 | 00137 | 00121 | 00145 | 00072 | 000001 | 72.00 |
| 00036 | 00036 | 00153 | 00069 | 00154 | 00157 | 00712 | 000002 | 356.00 |
| 00038 | 00038 | 00192 | 00075 | 00192 | 00079 | 00040 | 000001 | 40.00 |
| 00039 | 00039 | 00193 | 00089 | 00193 | 00095 | 00056 | 000001 | 56.00 |
| 00044 | 00044 | 00211 | 00103 | 00211 | 00139 | 00296 | 000001 | 296.00 |
| 00049 | 00049 | 00259 | 00103 | 00259 | 00139 | 00296 | 000001 | 296.00 |
| 00050 | 00050 | 00317 | 00025 | 00319 | 00125 | 00808 | 000003 | 269.33 |
| 00051 | 00051 | 00317 | 00137 | 00319 | 00199 | 00504 | 000003 | 168.00 |
| 00055 | 00055 | 00341 | 00039 | 00342 | 00043 | 00040 | 000002 | 20.00 |
| 00056 | 00056 | 00343 | 00139 | 00343 | 00143 | 00040 | 000001 | 40.00 |
| 00057 | 00057 | 00343 | 00151 | 00343 | 00155 | 00040 | 000001 | 40.00 |
| 00060 | 00060 | 00350 | 00139 | 00350 | 00143 | 00040 | 000001 | 40.00 |
| 00068 | 00068 | 00359 | 00151 | 00359 | 00155 | 00040 | 000001 | 40.00 |
| 00069 | 00069 | 00384 | 00025 | 00386 | 00125 | 00808 | 000003 | 269.33 |
| 00071 | 00071 | 00385 | 00137 | 00386 | 00199 | 00504 | 000002 | 252.00 |
| 00076 | 00076 | 00404 | 00055 | 00404 | 00059 | 00040 | 000001 | 40.00 |
| 00078 | 00078 | 00410 | 00027 | 00411 | 00033 | 00056 | 000002 | 28.00 |
| 00082 | 00082 | 00412 | 00139 | 00413 | 00143 | 00040 | 000002 | 20.00 |
| 00087 | 00087 | 00446 | 00025 | 00447 | 00125 | 00808 | 000002 | 404.00 |
| 00088 | 00088 | 00446 | 00137 | 00447 | 00199 | 00504 | 000002 | 252.00 |

TABLE B3

Thin Object Order.

| ORDER | ID | VALUE | NEXT |
| --- | --- | --- | --- |
| 0001 | 0001 | 0054 | 0006 |
| 0002 | 0010 | 0093 | 0005 |
| 0003 | 0009 | 0093 | 0004 |
| 0004 | 0008 | 0093 | 0003 |
| 0005 | 0007 | 0093 | 0002 |
| 0006 | 0006 | 0093 | 0008 |
| 0007 | 0035 | 0121 | 0007 |
| 0008 | 0032 | 0121 | 0009 |
| 0009 | 0036 | 0153 | 0010 |
| 0010 | 0038 | 0192 | 0011 |

TABLE B3-continued

Thin Object Order.

| ORDER | ID | VALUE | NEXT |
|---|---|---|---|
| 0011 | 0039 | 0193 | 0012 |
| 0012 | 0044 | 0211 | 0013 |
| 0013 | 0049 | 0259 | 0015 |
| 0014 | 0051 | 0318 | 0014 |
| 0015 | 0050 | 0318 | 0016 |
| 0016 | 0055 | 0341 | 0018 |
| 0017 | 0057 | 0343 | 0017 |
| 0018 | 0056 | 0343 | 0019 |
| 0019 | 0060 | 0350 | 0020 |
| 0020 | 0068 | 0359 | 0022 |
| 0021 | 0071 | 0385 | 0021 |
| 0022 | 0069 | 0385 | 0023 |
| 0023 | 0076 | 0404 | 0024 |
| 0024 | 0078 | 0410 | 0025 |
| 0025 | 0082 | 0412 | 0027 |
| 0026 | 0088 | 0446 | 0026 |
| 0027 | 0087 | 0446 | −001 |

TABLE B4

Merging Process: First Iteration

OBJECT 0010: 0093 0139 0093 0143
  WINDOW: 0077 0135 0109 0147
  OBJECTS WITHIN SEARCH RANGE . . .
    OBJECT 0009: 0093 0119 0093 0123 . . .
    OBJECT 0008: 0093 0105 0093 0111 . . .
    OBJECT 0007: 0093 0095 0093 0099 . . .
    OBJECT 0006: 0093 0087 0093 0091 . . .
    OBJECT 0035: 0121 0137 0121 0145 . . .
    OBJECT 0032: 0121 0119 0122 0123 . . .
OBJECT 0009: 0093 0119 0093 0123
  WINDOW: 0077 0115 0109 0127
  OBJECTS WITHIN SEARCH RANGE . . .
    OBJECT 0008: 0093 0105 0093 0111 . . .
    OBJECT 0007: 0093 0095 0093 0099 . . .
    OBJECT 0006: 0093 0087 0093 0091 . . .
    OBJECT 0035: 0121 0137 0121 0145 . . .
    OBJECT 0032: 0121 0119 0122 0123 . . .
OBJECT 0008: 0093 0105 0093 0111
  WINDOW: 0077 0101 0109 0115
  OBJECTS WITHIN SEARCH RANGE . . .
    OBJECT 0007: 0093 0095 0093 0099 . . .
    OBJECT 0006: 0093 0087 0093 0091 . . .
    OBJECT 0035: 0121 0137 0121 0145 . . .
    OBJECT 0032: 0121 0119 0122 0123 . . .
OBJECT 0007: 0093 0095 0093 0099
  WINDOW: 0077 0091 0109 0103
  OBJECTS WITHIN SEARCH RANGE . . .
    OBJECT 0006: 0093 0087 0093 0091 . . . CONTIGUOUS
OBJECT 0035: 0121 0137 0121 0145
  WINDOW: 0105 0133 0137 0149
  OBJECTS WITHIN SEARCH RANGE . . .
    OBJECT 0032: 0121 0119 0122 0123 . . .
    OBJECT 0036: 0153 0069 0154 0157 . . .
OBJECT 0032: 0121 0119 0122 0123
  WINDOW: 0105 0115 0138 0127
  OBJECTS WITHIN SEARCH RANGE . . .
    OBJECT 0036: 0153 0069 0154 0157 . . .
OBJECT 0036: 0153 0069 0154 0157
  WINDOW: 0137 0065 0170 0161
  OBJECTS WITHIN SEARCH RANGE . . .
OBJECT 0038: 0192 0075 0192 0079
  WINDOW: 0176 0071 0208 0083
  OBJECTS WITHIN SEARCH RANGE . . .
    OBJECT 0039: 0193 0089 0193 0095 . . .
    OBJECT 0044: 0211 0103 0211 0139 . . .
OBJECT 0039: 0193 0089 0193 0095
  WINDOW: 0177 0085 0209 0099
  OBJECTS WITHIN SEARCH RANGE . . .
    OBJECT 0044: 0211 0103 0211 0139 . . .
OBJECT 0044: 0211 0103 0211 0139
  WINDOW: 0195 0099 0227 0143
  OBJECTS WITHIN SEARCH RANGE . . .
OBJECT 0049: 0259 0103 0259 0139
  WINDOW: 0243 0099 0275 0143
  OBJECTS WITHIN SEARCH RANGE . . .
OBJECT 0051: 0317 0137 0319 0199
  WINDOW: 0301 0133 0335 0203

TABLE B4-continued

Merging Process: First Iteration

OBJECTS WITHIN SEARCH RANGE . . .
    OBJECT 0050: 0317 0025 0319 0125 . . .
    OBJECT 0055: 0341 0039 0342 0043 . . .
    OBJECT 0057: 0343 0151 0343 0155 . . .
    OBJECT 0056: 0343 0139 0343 0143 . . .
    OBJECT 0060: 0350 0139 0350 0143 . . .
OBJECT 0050: 0317 0025 0319 0125
  WINDOW: 0301 0021 0335 0129
  OBJECTS WITHIN SEARCH RANGE . . .
    OBJECT 0055: 0341 0039 0342 0043 . . .
    OBJECT 0057: 0343 0151 0343 0155 . . .
    OBJECT 0056: 0343 0139 0343 0143 . . .
    OBJECT 0060: 0350 0139 0350 0143 . . .
OBJECT 0055: 0341 0039 0342 0043
  WINDOW: 0325 0035 0358 0047
  OBJECTS WITHIN SEARCH RANGE . . .
    OBJECT 0057: 0343 0151 0343 0155 . . .
    OBJECT 0056: 0343 0139 0343 0143 . . .
    OBJECT 0060: 0350 0139 0350 0143 . . .
    OBJECT 0068: 0359 0151 0359 0155 . . .
OBJECT 0057: 0343 0151 0343 0155
  WINDOW: 0327 0147 0359 0159
  OBJECTS WITHIN SEARCH RANGE . . .
    OBJECT 0056: 0343 0139 0343 0143 . . .
    OBJECT 0060: 0350 0139 0350 0143 . . .
    OBJECT 0068: 0359 0151 0359 0155 . . . CONTIGUOUS
OBJECT 0056: 0343 0139 0343 0143
  WINDOW: 0327 0135 0359 0147
  OBJECTS WITHIN SEARCH RANGE . . .
    OBJECT 0060: 0350 0139 0350 0143 . . . CONTIGUOUS
OBJECT 0071: 0385 0137 0386 0199
  WINDOW: 0369 0133 0402 0203
  OBJECTS WITHIN SEARCH RANGE . . .
    OBJECT 0069: 0384 0025 0386 0125 . . .
    OBJECT 0076: 0404 0055 0404 0059 . . .
    OBJECT 0078: 0410 0027 0411 0033 . . .
    OBJECT 0082: 0412 0139 0413 0143 . . .
OBJECT 0069: 0384 0025 0386 0125
  WINDOW: 0368 0021 0402 0129
  OBJECTS WITHIN SEARCH RANGE . . .
    OBJECT 0076: 0404 0055 0404 0059 . . .
    OBJECT 0078: 0410 0027 0411 0033 . . .
    OBJECT 0082: 0412 0139 0413 0143 . . .
OBJECT 0076: 0404 0055 0404 0059
  WINDOW: 0388 0051 0420 0063
  OBJECTS WITHIN SEARCH RANGE . . .
    OBJECT 0078: 0410 0027 0411 0033 . . .
    OBJECT 0082: 0412 0139 0413 0143 . . .
OBJECT 0078: 0410 0027 0411 0033
  WINDOW: 0394 0023 0427 0037
  OBJECTS WITHIN SEARCH RANGE . . .
    OBJECT 0082: 0412 0139 0413 0143 . . .
OBJECT 0082: 0412 0139 0413 0143
  WINDOW: 0396 0135 0429 0147
  OBJECTS WITHIN SEARCH RANGE . . .
OBJECT 0088: 0446 0137 0447 0199
  WINDOW: 0430 0133 0463 0203
  OBJECTS WITHIN SEARCH RANGE . . .
    OBJECT 0087: 0446 0025 0447 0125 . . .

TABLE B5

Thin Object Order (After the First Iteration).

| ORDER | ID | VALUE | NEXT |
|---|---|---|---|
| 0001 | 0001 | 0054 | 0005 |
| 0002 | 0010 | 0093 | 0004 |
| 0003 | 0009 | 0093 | 0003 |
| 0004 | 0008 | 0093 | 0002 |
| 0005 | 0007 | 0093 | 0007 |
| 0006 | 0035 | 0121 | 0006 |
| 0007 | 0032 | 0121 | 0008 |
| 0008 | 0036 | 0153 | 0009 |
| 0009 | 0038 | 0192 | 0010 |
| 0010 | 0039 | 0193 | 0011 |
| 0011 | 0044 | 0211 | 0012 |
| 0012 | 0049 | 0259 | 0014 |
| 0013 | 0051 | 0318 | 0013 |
| 0014 | 0050 | 0318 | 0015 |
| 0015 | 0055 | 0341 | 0016 |

TABLE B5-continued

Thin Object Order (After the First Iteration).

| ORDER | ID | VALUE | NEXT |
|---|---|---|---|
| 0016 | 0056 | 0346 | 0017 |
| 0017 | 0057 | 0351 | 0019 |
| 0018 | 0071 | 0385 | 0018 |
| 0019 | 0069 | 0385 | 0020 |
| 0020 | 0076 | 0404 | 0021 |
| 0021 | 0078 | 0410 | 0022 |
| 0022 | 0082 | 0412 | 0024 |
| 0023 | 0088 | 0446 | 0023 |
| 0024 | 0087 | 0446 | −001 |

TABLE B6

Merging Process: Second Iteration.

```
OBJECT 0001: 0054 0069 0055 0157
  WINDOW: 0038 0065 0071 0161
  OBJECTS WITHIN SEARCH RANGE ...
OBJECT 0010: 0093 0139 0093 0143
  WINDOW: 0077 0135 0109 0147
  OBJECTS WITHIN SEARCH RANGE ...
    OBJECT 0009: 0093 0119 0093 0123 ...
    OBJECT 0008: 0093 0105 0093 0111 ...
    OBJECT 0007: 0093 0087 0093 0099 ...
    OBJECT 0035: 0121 0137 0121 0145 ...
    OBJECT 0032: 0121 0119 0122 0123 ...
OBJECT 0009: 0093 0119 0093 0123
  WINDOW: 0077 0115 0109 0127
  OBJECTS WITHIN SEARCH RANGE ...
    OBJECT 0008: 0093 0105 0093 0111 ...
    OBJECT 0007: 0093 0087 0093 0099 ...
    OBJECT 0035: 0121 0137 0121 0145 ...
    OBJECT 0032: 0121 0119 0122 0123 ...
OBJECT 0008: 0093 0105 0093 0111
  WINDOW: 0077 0101 0109 0115
  OBJECTS WITHIN SEARCH RANGE ...
    OBJECT 0007: 0093 0087 0093 0099 ...
    OBJECT 0035: 0121 0137 0121 0145 ...
    OBJECT 0032: 0121 0119 0122 0123 ...
OBJECT 0007: 0093 0087 0093 0099
  WINDOW: 0077 0083 0109 0103
  OBJECTS WITHIN SEARCH RANGE ...
    OBJECT 0035: 0121 0137 0121 0145 ...
    OBJECT 0032: 0121 0119 0122 0123 ...
OBJECT 0035: 0121 0137 0121 0145
  WINDOW: 0105 0133 0137 0149
  OBJECTS WITHIN SEARCH RANGE ...
    OBJECT 0032: 0121 0119 0122 0123 ...
    OBJECT 0036: 0153 0069 0154 0157 ...
OBJECT 0032: 0121 0119 0122 0123
  WINDOW: 0105 0115 0138 0127
  OBJECTS WITHIN SEARCH RANGE ...
    OBJECT 0036: 0153 0069 0154 0157 ...
OBJECT 0036: 0153 0069 0154 0157
  WINDOW: 0137 0065 0170 0161
  OBJECTS WITHIN SEARCH RANGE ...
OBJECT 0038: 0192 0075 0192 0079
  WINDOW: 0176 0071 0208 0083
  OBJECTS WITHIN SEARCH RANGE ...
    OBJECT 0039: 0193 0089 0193 0095 ...
    OBJECT 0044: 0211 0103 0211 0139 ...
OBJECT 0039: 0193 0089 0193 0095
```

TABLE B6-continued

Merging Process: Second Iteration.

```
  WINDOW: 0177 0085 0209 0099
  OBJECTS WITHIN SEARCH RANGE ...
    OBJECT 0044: 0211 0103 0211 0139 ...
OBJECT 0044: 0211 0103 0211 0139
  WINDOW: 0195 0099 0227 0143
  OBJECTS WITHIN SEARCH RANGE ...
OBJECT 0049: 0259 0103 0259 0139
  WINDOW: 0243 0099 0275 0143
  OBJECTS WITHIN SEARCH RANGE ...
OBJECT 0051: 0317 0137 0319 0199
  WINDOW: 0301 0133 0335 0203
  OBJECTS WITHIN SEARCH RANGE ...
    OBJECT 0050: 0317 0025 0319 0125 ...
    OBJECT 0055: 0341 0039 0342 0043 ...
    OBJECT 0056: 0343 0139 0350 0143 ...
OBJECT 0050: 0317 0025 0319 0125
  WINDOW: 0301 0021 0335 0129
  OBJECTS WITHIN SEARCH RANGE ...
    OBJECT 0055: 0341 0039 0342 0043 ...
    OBJECT 0056: 0343 0139 0350 0143 ...
OBJECT 0055: 0341 0039 0342 0043
  WINDOW: 0325 0035 0358 0047
  OBJECTS WITHIN SEARCH RANGE ...
    OBJECT 0056: 0343 0139 0350 0143 ...
    OBJECT 0057: 0343 0151 0359 0155 ...
OBJECT 0056: 0343 0139 0350 0143
  WINDOW: 0327 0135 0366 0147
  OBJECTS WITHIN SEARCH RANGE ...
    OBJECT 0057: 0343 0151 0359 0155 ...
OBJECT 0057: 0343 0151 0359 0155
  WINDOW: 0327 0147 0375 0159
  OBJECTS WITHIN SEARCH RANGE ...
OBJECT 0071: 0385 0137 0386 0199
  WINDOW: 0369 0133 0402 0203
  OBJECTS WITHIN SEARCH RANGE ...
    OBJECT 0069: 0384 0025 0386 0125 ...
    OBJECT 0076: 0404 0055 0404 0059 ...
    OBJECT 0078: 0410 0027 0411 0033 ...
    OBJECT 0082: 0412 0139 0413 0143 ...
OBJECT 0069: 0384 0025 0386 0125
  WINDOW: 0368 0021 0402 0129
  OBJECTS WITHIN SEARCH RANGE ...
    OBJECT 0076: 0404 0055 0404 0059 ...
    OBJECT 0078: 0410 0027 0411 0033 ...
    OBJECT 0082: 0412 0139 0413 0143 ...
OBJECT 0076: 0404 0055 0404 0059
  WINDOW: 0388 0051 0420 0063
  OBJECTS WITHIN SEARCH RANGE ...
    OBJECT 0078: 0410 0027 0411 0033 ...
    OBJECT 0082: 0412 0139 0413 0143 ...
OBJECT 0078: 0410 0027 0411 0033
  WINDOW: 0394 0023 0427 0037
  OBJECTS WITHIN SEARCH RANGE ...
    OBJECT 0082: 0412 0139 0413 0143 ...
OBJECT 0082: 0412 0139 0413 0143
  WINDOW: 0396 0135 0429 0147
  OBJECTS WITHIN SEARCH RANGE ...
OBJECT 0088: 0446 0137 0447 0199
  WINDOW: 0430 0133 0463 0203
  OBJECTS WITHIN SEARCH RANGE ...
    OBJECT 0087: 0446 0025 0447 0125 ...
             NO CHANGES!
```

TABLE B7

Lines Recognized After Merging

| OBJ # | REAL | UP | LEFT | DOWN | RIGHT | WIDTH | HEIGHT | RATIO |
|---|---|---|---|---|---|---|---|---|
| 00001 | 00001 | 00054 | 00069 | 00055 | 00157 | 00712 | 000002 | 356.00 |
| 00007 | 00007 | 00093 | 00087 | 00093 | 00099 | 00104 | 000001 | 104.00 |
| 00008 | 00008 | 00093 | 00105 | 00093 | 00111 | 00056 | 000001 | 56.00 |
| 00009 | 00009 | 00093 | 00119 | 00093 | 00123 | 00040 | 000001 | 40.00 |
| 00010 | 00010 | 00093 | 00139 | 00093 | 00143 | 00040 | 000001 | 40.00 |
| 00032 | 00032 | 00121 | 00119 | 00122 | 00123 | 00040 | 000002 | 20.00 |
| 00035 | 00035 | 00121 | 00137 | 00121 | 00145 | 00072 | 000001 | 72.00 |
| 00036 | 00036 | 00153 | 00069 | 00154 | 00157 | 00712 | 000002 | 356.00 |
| 00038 | 00038 | 00192 | 00075 | 00192 | 00079 | 00040 | 000001 | 40.00 |
| 00039 | 00039 | 00193 | 00089 | 00193 | 00095 | 00056 | 000001 | 56.00 |
| 00044 | 00044 | 00211 | 00103 | 00211 | 00139 | 00296 | 000001 | 296.00 |
| 00049 | 00049 | 00259 | 00103 | 00259 | 00139 | 00296 | 000001 | 296.00 |

TABLE B7-continued

Lines Recognized After Merging

| OBJ # | REAL | UP | LEFT | DOWN | RIGHT | WIDTH | HEIGHT | RATIO |
|---|---|---|---|---|---|---|---|---|
| 00050 | 00050 | 00317 | 00025 | 00319 | 00125 | 00808 | 000003 | 269.33 |
| 00051 | 00051 | 00317 | 00137 | 00319 | 00199 | 00504 | 000003 | 168.00 |
| 00055 | 00055 | 00341 | 00039 | 00342 | 00043 | 00040 | 000002 | 20.00 |
| 00056 | 00056 | 00343 | 00139 | 00350 | 00143 | 00040 | 000008 | 5.00 |
| 00057 | 00057 | 00343 | 00151 | 00359 | 00155 | 00040 | 000017 | 2.35 |
| 00069 | 00069 | 00384 | 00025 | 00386 | 00125 | 00808 | 000003 | 269.33 |
| 00071 | 00071 | 00385 | 00137 | 00386 | 00199 | 00504 | 000002 | 252.00 |
| 00076 | 00076 | 00404 | 00055 | 00404 | 00059 | 00040 | 000001 | 40.00 |
| 00078 | 00078 | 00410 | 00027 | 00411 | 00033 | 00056 | 000002 | 28.00 |
| 00082 | 00082 | 00412 | 00139 | 00413 | 00143 | 00040 | 000002 | 20.00 |
| 00087 | 00087 | 00446 | 00025 | 00447 | 00125 | 00808 | 000002 | 404.00 |
| 00088 | 00088 | 00446 | 00137 | 00447 | 00199 | 00504 | 000002 | 252.00 |

TABLE B8

Lines Recognized After Post-Processing.

| OBJ # | REAL | UP | LEFT | DOWN | RIGHT | WIDTH | HEIGHT | RATIO |
|---|---|---|---|---|---|---|---|---|
| 00001 | 00001 | 00054 | 00069 | 00055 | 00157 | 00712 | 000002 | 356.00 |
| 00007 | 00007 | 00093 | 00087 | 00093 | 00099 | 00104 | 000001 | 104.00 |
| 00036 | 00036 | 00153 | 00069 | 00154 | 00157 | 00712 | 000002 | 356.00 |
| 00044 | 00044 | 00211 | 00103 | 00211 | 00139 | 00296 | 000001 | 296.00 |
| 00049 | 00049 | 00259 | 00103 | 00259 | 00139 | 00296 | 000001 | 296.00 |
| 00050 | 00050 | 00317 | 00025 | 00319 | 00125 | 00808 | 000003 | 269.33 |
| 00051 | 00051 | 00317 | 00137 | 00319 | 00199 | 00504 | 000003 | 168.00 |
| 00069 | 00069 | 00384 | 00025 | 00386 | 00125 | 00808 | 000003 | 269.33 |
| 00071 | 00071 | 00385 | 00137 | 00386 | 00199 | 00504 | 000002 | 252.00 |
| 00087 | 00087 | 00446 | 00025 | 00447 | 00125 | 00808 | 000002 | 404.00 |
| 00088 | 00088 | 00446 | 00137 | 00447 | 00199 | 00504 | 000002 | 252.00 |

While the normal mode is preferred when the library is integrated into the form recognition system, the debug mode has been used extensively, along with an X-windows display program, to create a visual representation of the lines generated by the algorithm. Aside from being a source code debugging aide, the most important use of this tool has been in conducting experiments to identify the critical parameters of the algorithm. The results of these experiments are described next.

8.2 Testing

There are four characteristics of scanned images that affect the way in which regular lines are identified. They are: (1) skewing or rotation; (2) the threshold value used in the binarization process (contrast); (3) the background noise created by impurities in the scanning mechanism; and (4) the presence of text and/or signatures. Similarly, there are several parameters that can be adjusted to deal with these variables; see Table 3.

The main goals of the testing phase have been determining which of these parameters are critical, and finding suitable values. The remainder of the section describes the experience gathered during this process.

TABLE 3

Line Recognition Parameters.

| | |
|---|---|
| MAX_THICKNES | Section 7.2 |
| MIN_RATIO | " |
| MIN_HOR_SEG_LEN | " |
| MIN_VER_SEG_LEN | " |
| MAX_DISTANCE | Section 7.3 |
| HOR_X_SEP | " |
| HOR_Y_SEP | " |
| VER_X_SEP | " |
| VER_Y_SEP | " |
| MIN_HOR_LINE_LEN | Section 7.3 |
| MIN_VER_LINE_LEN | " |
| MIN_NO_INTERSECTION_WIDTH | " |
| MIN_NO_INTERSECTION_HEIGHT | " |

The experimentation phase of the project began with an intuitive analysis of the impact that the image characteristics shown above could have on the recognition process. This analysis indicated that even a small degree of rotation could result broken lines. The same problem would occur if the contrast of the image is too light, thus creating discontinuities in the line pattern. Conversely, dark forms would tend to generate lines in dense text areas, or where signatures appear.

In order to confirm these hypothesis, and also to determine the sensitivity of the algorithm to changes in parameter values, it was necessary to create a series of test forms combining the characteristics of interest. These forms were generated automatically using a template form scanned directly from a paper document, then adding noise (rotation, text, background noise, contrast) through image processing functions.

There were a total of 25 forms generated. This number resulted from combining five rotation levels ($-2, -1, 0, +1, +2$ degrees) with five contrast categories (very light, light, normal, dark and very dark).

Figure 21:
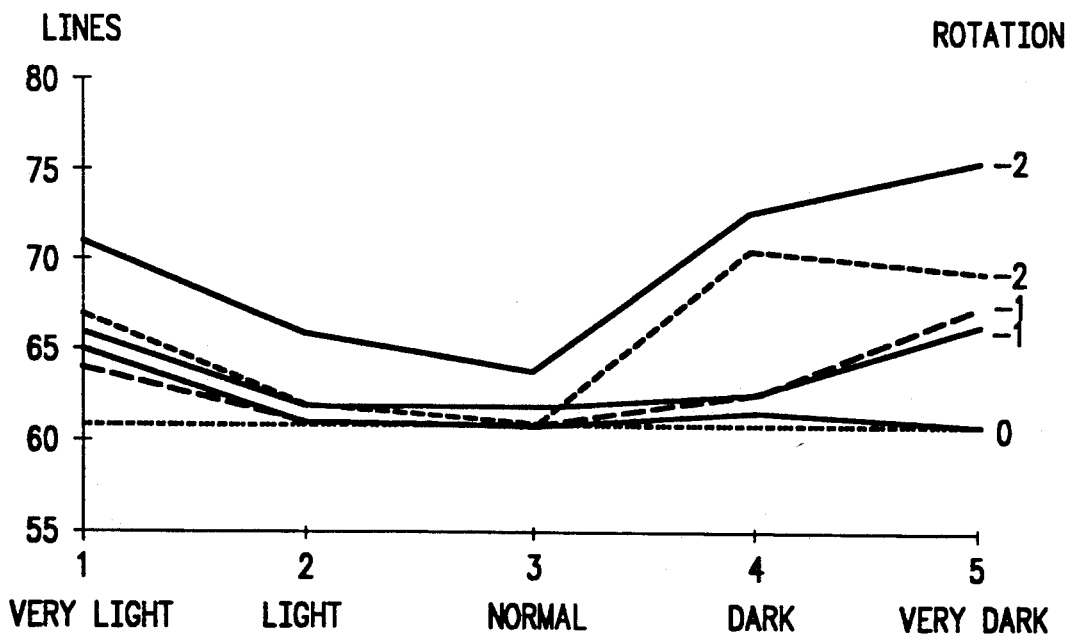
FIG. 21 depicts number of lines identified in an initial test.

The initial stage of the testing process involved calibrating the system to identify the lines in the template form. Table 4 shows the parameter values that yielded the correct results; in this case 41 horizontal and 20 vertical lines. These values were then applied to the remainder of the forms obtaining the results shown in Table 5. As expected, the number of lines identified in "light" forms far exceeded the values shown above. This experiment also showed that the system is more sensitive to the image contrast that to the degree of skewing. This observation is better appreciated in FIG. 21 where the number of horizontal lines found in each case is plotted.

Another observation derived from Table 5 is that the number of vertical lines is near the number expected in all the cases, thus indicating that vertical lines are less affected by skewing and contrast. This fact may be explained by the difference in the number of horizontal and vertically oriented objects (including text and shaded areas) that appear in the image. A closer look at the lines identified in the test case that combines skewing with very dark contrast shows that many of the additional lines were found in the shaded areas of the form or in the text.

TABLE 4

| Initial Parameter Values. | |
|---|---|
| MAX_THICKNES | 3 |
| MIN_RATIO | 23.0 |
| MIN_HOR_SEG_LEN | 33 |
| MIN_VER_SEG_LEN | 33 |
| MAX_DISTANCE | 48 |
| HOR_X_SEP | 16 |
| HOR_Y_SEP | 4 |
| VER_X_SEP | 16 |
| VER_Y_SEP | 3 |
| MIN_HOR_LINE_LEN | 65 |
| MIN_VER_LINE_LEN | 65 |
| MIN_NO_INTERSECTION_WIDTH | 192 |
| MIN_NO_INTERSECTION_HEIGHT | 192 |

TABLE 5

Initial Results.

| Rotation | Contrast | Hor. Lines | Ver. Lines | Total |
|---|---|---|---|---|
| −2 | Very Light | 0047 | 0024 | 0071 |
|  | Light | 0041 | 0025 | 0066 |
|  | Normal | 0040 | 0024 | 0064 |
|  | Dark | 0042 | 0031 | 0073 |
|  | Very Dark | 0043 | 0033 | 0076 |
| −1 | Very Light | 0046 | 0020 | 0066 |
|  | Light | 0042 | 0020 | 0062 |
|  | Normal | 0042 | 0020 | 0062 |
|  | Dark | 0043 | 0020 | 0063 |
|  | Very Dark | 0044 | 0023 | 0067 |
| 0 | Very Light | 0045 | 0020 | 0065 |
|  | Light | 0041 | 0020 | 0061 |
|  | Normal | 0041 | 0020 | 0061 |
|  | Dark | 0042 | 0020 | 0062 |
|  | Very Dark | 0041 | 0020 | 0061 |
| +1 | Very Light | 0043 | 0021 | 0064 |
|  | Light | 0041 | 0020 | 0061 |
|  | Normal | 0041 | 0020 | 0061 |
|  | Dark | 0043 | 0020 | 0063 |
|  | Very Dark | 0040 | 0028 | 0068 |
| +2 | Very Light | 0047 | 0020 | 0067 |
|  | Light | 0042 | 0020 | 0062 |
|  | Normal | 0041 | 0020 | 0061 |
|  | Dark | 0043 | 0028 | 0071 |
|  | Very Dark | 0040 | 0030 | 0070 |

TABLE 6

Results After HOR_SEG_LEN was Changed to 17.

| Rotation | Contrast | Hor. Lines | Ver. Lines | Total |
|---|---|---|---|---|
| −2 | Very Light | 0043 | 0021 | 0064 |
|  | Light | 0041 | 0020 | 0061 |
|  | Normal | 0040 | 0020 | 0061 |
|  | Dark | 0043 | 0024 | 0067 |
|  | Very Dark | 0043 | 0027 | 0068 |
| −1 | Very Light | 0044 | 0020 | 0064 |
|  | Light | 0045 | 0020 | 0065 |
|  | Normal | 0044 | 0020 | 0064 |
|  | Dark | 0044 | 0022 | 0066 |
|  | Very Dark | 0043 | 0027 | 0070 |
| 0 | Very Light | 0042 | 0020 | 0062 |
|  | Light | 0042 | 0020 | 0062 |
|  | Normal | 0042 | 0020 | 0062 |
|  | Dark | 0045 | 0020 | 0065 |
|  | Very Dark | 0041 | 0020 | 0061 |
| +1 | Very Light | 0042 | 0020 | 0062 |
|  | Light | 0042 | 0020 | 0062 |
|  | Normal | 0042 | 0020 | 0062 |

TABLE 6-continued

Results After HOR_SEG_LEN was Changed to 17.

| Rotation | Contrast | Hor. Lines | Ver. Lines | Total |
|---|---|---|---|---|
|  | Dark | 0044 | 0020 | 0064 |
|  | Very Dark | 0040 | 0027 | 0067 |
| +2 | Very Light | 0045 | 0020 | 0065 |
|  | Light | 0043 | 0020 | 0063 |
|  | Normal | 0043 | 0020 | 0063 |
|  | Dark | 0043 | 0025 | 0068 |
|  | Very Dark | 0038 | 0028 | 0066 |

A review of the connected components found in the analysis of dark forms revealed that extra lines were being extracted from areas, because the value of HOR_SEG_LEN allowed small segments to be accepted. These segments, when merged, generated the additional lines. Table 6 shows the results of the test when HOR_SEG_LEN was changed from 33 to 17. As expected, the number of lines recognized in these forms decreased to within 10% of the number expected. However, this change affected adversely the number of lines found in light forms.

9. Conclusions

This application discloses a form recognition system using a new line recognition algorithm to be used in the extraction of features from business forms. The method is more efficient than other line extraction approaches because it focuses exclusively on regular lines. It also makes use of specific knowledge about the structure of business forms. Results of an evaluation test indicate that its accuracy is satisfactory.

References

[1] S. Mori and T. Sakura, "Line Filtering and its Application to Stroke Segmentation of Handprinted Chinese Characters," *Proceedings of the Seventh International Conference on Pattern Recognition*, pp. 366–369, 1984.

[2] Pavlidis T., "A Vectorizer and Feature Extractor for Document Recognition," *Computer Vision, Graphics, and Image Processing*, No. 35, pp. 111–127, 1986.

[3] H. Bunke, "Automatic Interpretation of Text and Graphics in Circuit Diagrams," *Pattern Recognition Theory Applications*, J. Kittler, K. S. Fu and L. F. Pau Editors, D. Reidel, Boston, pp. 297–310, 1982.

[4] M. Karima, K. S. Sadahl, and T. O. McNeil, "From Paper Drawings to Computer Aided Design," *IEEE Computer Graphics and Applications*, pp. 24–39, Feb. 1985.

[5] L. A. Fletcher and R. Katsuri, "Segmentation of Binary Images into Text Strings and Graphics," *SPIE* Vol. 786 Applications of Artificial Intelligence, pp. 533–540, 1987.

[6] C. C. Shih, R. Katsuri, "Generation of a Line Description File for Graphics Recognition," *SPIE* Vol. 937 Applications of Artificial Intelligence, pp. 568–575, 1988.

[7] W. K. Pratt, *Digital Image Processing*, Wiley, New York, pp. 523–525, 1978.

[8] R. L. Adams, *Ten-Second Business Forms*, Bob Adams, Inc., Boston, 1987.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A business form recognition system comprising
means for storing template features of one or more business forms,
means for scanning one or more actual business forms to form scanned data representative thereof, including means for scanning said actual business forms on a line by line basis to form black and white pixel data representative thereof and means for identifying neighboring ones of said black pixels to identify connected components having X and Y components,
pattern recognition means for recognizing said scanned data, wherein said pattern recognition means include means for recognizing only vertical and horizontal line patterns on said scanned business forms,
matching means for matching the recognized data with a plurality of stored forms to provide a determination of the type of the actual business forms,
means for determining if said connected component forms elongated line segments,
means for determining whether two or more contiguous segments are part of the same line on said business form and means for merging said segments considered to be part of the same line,
post-processing means for eliminating noise or skewing information, and
indexed dictionary access means for adding the length of all lines found in the scanned image to form a key value.

2. The system as in claim 1 including aggregate discrimination means to condense line information from said template and actual forms into single scalar values such as line and intersection counts or line length sums so as to discard templates from a candidate list.

3. The system as in claim 2 including intersection discrimination means to determine the spatial similarity between two or more line patterns.

4. The system as in claim 3 including approximation discrimination means for measuring the distribution of lines in said scanned image to condense the projection information into a binary value representative of the presence of lines in predefined regions of said image.

5. The system as in claim 4 including projection discrimination means for comparing the line length and the distance between lines.

6. The system as in claim 5 including window matching means for analyzing the line patterns in said actual and template forms.

7. The system as in claim 6 including decision function means for determining the type of actual business form.

8. The system as in claim 1 wherein said means for storing includes means for organizing template features in hierarchical fashion.

9. The system as in claim 1 including means for displaying partial results of the matching process.

10. An image processing system for automatically recognizing and classifying heterogeneous business forms, comprising:
means for storing a plurality of template features of one or more business forms;
means for scanning one or more actual business forms;
means for extracting features of said actual business forms, wherein said means for extracting includes means for scanning said actual business forms on a line by line basis to form black and white pixel data representative thereof, means for identifying neighboring ones of said black pixels to identify connected components having X and Y components, means for determining if said connected components form elongated line segments, means for determining whether two or more contiguous segments are part of the same line, and means for merging said segments considered to be part of the same line; and
matching means for sequentially matching said extracted features with the plurality of stored template features, wherein said means for matching includes means for recognizing vertical and horizontal lines, means for adding the length of al lines found in the scanned image to form a key value, means to condense line information from said template and actual forms into single scalar values such as line and intersection counts or line length sums so as to discard templates from a candidate list, means to determine the spatial similarity between two or more line patterns, means for measuring the distribution of lines in said scanned image to condense the projection information into a binary value representative of the presence of lines in predefined region of said image, means for comparing the line length and the distance between lines, means for analyzing the line patterns in said actual and template forms and means for determining the type of actual business form.

11. A business form recognition system comprising
means for storing template features of one or more business forms,
means for scanning one or more actual business forms to form scanned data representative thereof, including means for scanning said actual business forms on a line by line basis to form black and white pixel data representative thereof and means for identifying neighboring ones of said black pixels to identify connected components having X and Y components,
pattern recognition means for recognizing said scanned data, wherein said pattern recognition means include means for recognizing only vertical and horizontal line patterns on said scanned business forms,
matching means for matching the recognized data with a plurality of stored forms to provide a determination of the type of the actual business form, said matching means including
indexed dictionary access means for adding the length of all lines found in the scanned image to form a key value,
aggregate discrimination means to condense line information from said template and actual forms into single scalar values such as line and intersection counts or line length sums so as to discard templates from a candidate list,
intersection discrimination means to determine the spatial similarity between two or more line patterns, approximation discrimination means for measuring the distribution of lines in said scanned image to condense the projection information into a binary value representative of the presence of lines in predefined regions of said image,
projection discrimination means for comparing the line length and the distance between lines,
window matching means for analyzing the line patterns in said actual and template forms, and
decision function means for determining the type of actual business form.

* * * * *